United States Patent
Greene et al.

(10) Patent No.: US 7,898,105 B2
(45) Date of Patent: Mar. 1, 2011

(54) RF POWERED SPECIALTY LIGHTING, MOTION, SOUND

(75) Inventors: Charles E. Greene, Cabot, PA (US); Daniel W. Harrist, Carnegie, PA (US); Michael Thomas McElhinny, Port Vue, PA (US); David Jeffrey Graham, Cranberry Township, PA (US)

(73) Assignee: Powercast Corporation, Ligonier, PA (US)

( * ) Notice: Subject to any disclaimer, the term of this patent is extended or adjusted under 35 U.S.C. 154(b) by 508 days.

(21) Appl. No.: 11/897,345

(22) Filed: Aug. 30, 2007

(65) Prior Publication Data

US 2008/0054729 A1 Mar. 6, 2008

Related U.S. Application Data

(60) Provisional application No. 60/841,819, filed on Sep. 1, 2006.

(51) Int. Cl.
*H02J 1/10* (2006.01)
*H02J 7/34* (2006.01)

(52) U.S. Cl. .......................................................... 307/18
(58) Field of Classification Search ...................... 307/18
See application file for complete search history.

(56) References Cited

U.S. PATENT DOCUMENTS

| 5,118,196 A | 6/1992 | Ault et al. |
| 5,217,296 A | 6/1993 | Tanner et al. |
| 5,317,238 A | 5/1994 | Schaedel |
| 6,510,067 B1 * | 1/2003 | Toebes .......................... 363/146 |
| 6,793,363 B2 | 9/2004 | Jensen |
| 2006/0113955 A1 | 6/2006 | Nunally |
| 2006/0163598 A1 | 7/2006 | Lin |

OTHER PUBLICATIONS

International Search Report and Written Opinion mailed Mar. 17, 2008 for International Application No. PCT/US07/19029, International Filing Date Aug. 30, 2007, pp. 11.
J. Shipley et al., "Incorporating Wireless Power Transfer in an LED Lighting Application", A thesis submitted to the faculty of Brigham Young University, Aug. 2006 [retrieved on Jan. 18, 2008]. Retrieved from the Internet http://contentdm.lib.byu.edu/ETD/image/etd1455.pdf, pp. 81.

* cited by examiner

*Primary Examiner* — Jared J Fureman
*Assistant Examiner* — Dru M Parries

(57) ABSTRACT

Disclosed is a system for wirelessly powering an item. A source is configured to send wireless power. A target is configured to receive the wireless power and convert the wireless power to a useable power. A component is connected to and configured to receive the useable power from the target. When the component receives the usable power, the component activates. Also disclosed is an assembly including a system for wirelessly powering a component and a structure for supporting the system and an item.

51 Claims, 26 Drawing Sheets

RF POWERED SPECIALTY LIGHTING, MOTION, SOUND

CROSS-REFERENCE TO RELATED APPLICATIONS

This application claims priority to U.S. Provisional Patent Application No. 60/841,819, filed Sep. 1, 2006, and entitled "RF Powered Specialty Lighting, Motion, Sound."

FIELD OF THE INVENTION

The present invention is directed to specialty items, such as lighted decorations, which are directly powered or recharged from a remote source.

BACKGROUND OF THE INVENTION

It is known to have specialty items that are hard wired for power or utilize batteries for power. These wires can be cumbersome and unaesthetic and even a potential fire hazard. Batteries must eventually be replaced, and the more items there are, the more tedious become such a task. The present invention avoids these problems.

BRIEF SUMMARY OF THE INVENTION

It is an object of this invention to provide a system for specialty items (devices) having one or more activated modes to affect a result or desired outcome, for example, to stimulate the senses. A mode may correlate to one or more of the senses—sight, sound, scent, taste, and touch. The items are powered and/or recharged using wireless RF power.

The specialty items may be, but are not limited to, decorations (holiday, theme, and general), props, displays, and sensor (e.g., safety) assemblies. For example, the items may be ornaments, lights (bulbs, LEDs, EL, EL strings, rope lights, etc), tree toppers, centerpieces, home décor, landscape décor, emergency back-up lights, smoke/fire detectors. Applications with which the invention may be used are, for example, store displays, showrooms, window displays, Christmas trees (real or artificial), outdoor and/or indoor lighting systems, alarm systems.

It is another object of this invention to provide an assembly including a system for wirelessly powering a specialty item and a structure for mounting or supporting the system. For example, the structure may be a Christmas tree, a mannequin, a light post, a stand.

In general, a simple system according to the present invention includes an RF power transmitter ("transmitter") and an RF power receiver ("receiver"). The RF power receiver is connected to a component of an item that requires power to be activated, where activation produces light, movement, sound, etc. or combinations thereof.

The system according to the present invention may be retrofitted onto/into an existing item, group of items, or structure or the system may be designed as an integral part of the item, group of items, or structure.

The present invention pertains to a system for wirelessly powering an item. The system comprises a source configured to send wireless power. The system comprises a target configured to receive the wireless power and convert the wireless power to a useable power. The system comprises a component connected to and configured to receive the useable power from the target, wherein when the component receives the usable power, the component activates and the active component can be sensed by a person.

The present invention pertains to an assembly. The assembly comprises a system for wirelessly powering a component. The assembly comprises a structure for supporting the system. The system includes a source configured to send wireless power. The system includes a target electrically connected to the component and configured to receive the wireless power, to convert the wireless power to a useable power, and to activate a component using the useable power.

The present invention pertains to an item that is wirelessly powered. The item comprises a target configured to receive wireless power and convert the wireless power to a useable power. The item comprises a component connected to and configured to receive the useable power from the target, wherein when the component receives the usable power, the component activates, and the active component can be sensed by a person.

The present invention pertains to a method for wirelessly powering an item comprising the steps of sending wireless power from a source. There is the step of receiving the wireless power at a target. There is the step of converting the wireless power to a useable power at the target. There is the step of receiving the useable power from the target at a component connected to the target. There is the step of activating by the component when the component receives the usable power, wherein the active component can be sensed by a person.

The present invention pertains to a structure for supporting. The structure comprises a base. The structure comprises an element extending from the base having a first portion through which at least one wireless power transmitter is attached to the element, and a second portion through which at least one target configured to receive the wireless power and convert the wireless power to a useable power is attached to the element.

The present invention pertains to a system for wirelessly power an item attached to a tree. The system comprises a source configured to send wireless power. The system comprises at least one target configured to receive the wireless power and convert the wireless power to a useable power wherein the at least one target is attached to the tree.

The present invention pertains to an ornament. The ornament comprises a housing having a snowflake shape or an orb shape or a jack-o-lantern shape. The ornament comprises a receiving antenna in contact with a housing. The ornament comprises a wireless RF energy harvester disposed in the housing that receives wireless energy and converts it into DC. The ornament comprises a plurality of LEDs disposed in the housing electrically connected to and powered by the harvester.

The present invention pertains to a Christmas tree. The tree comprises a structure having a trunk and branches. The tree comprises a plurality of ornaments which are held by the structure. Each ornament having a receiving antenna, a wireless RF power harvester connected to the receiving antenna which converts RF wireless energy into DC, and at least one LED electrically connected to and powered by the harvester. The tree comprises an RF transmitter which transmits wireless RF energy to the ornaments and in electrical communication with the ornaments.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
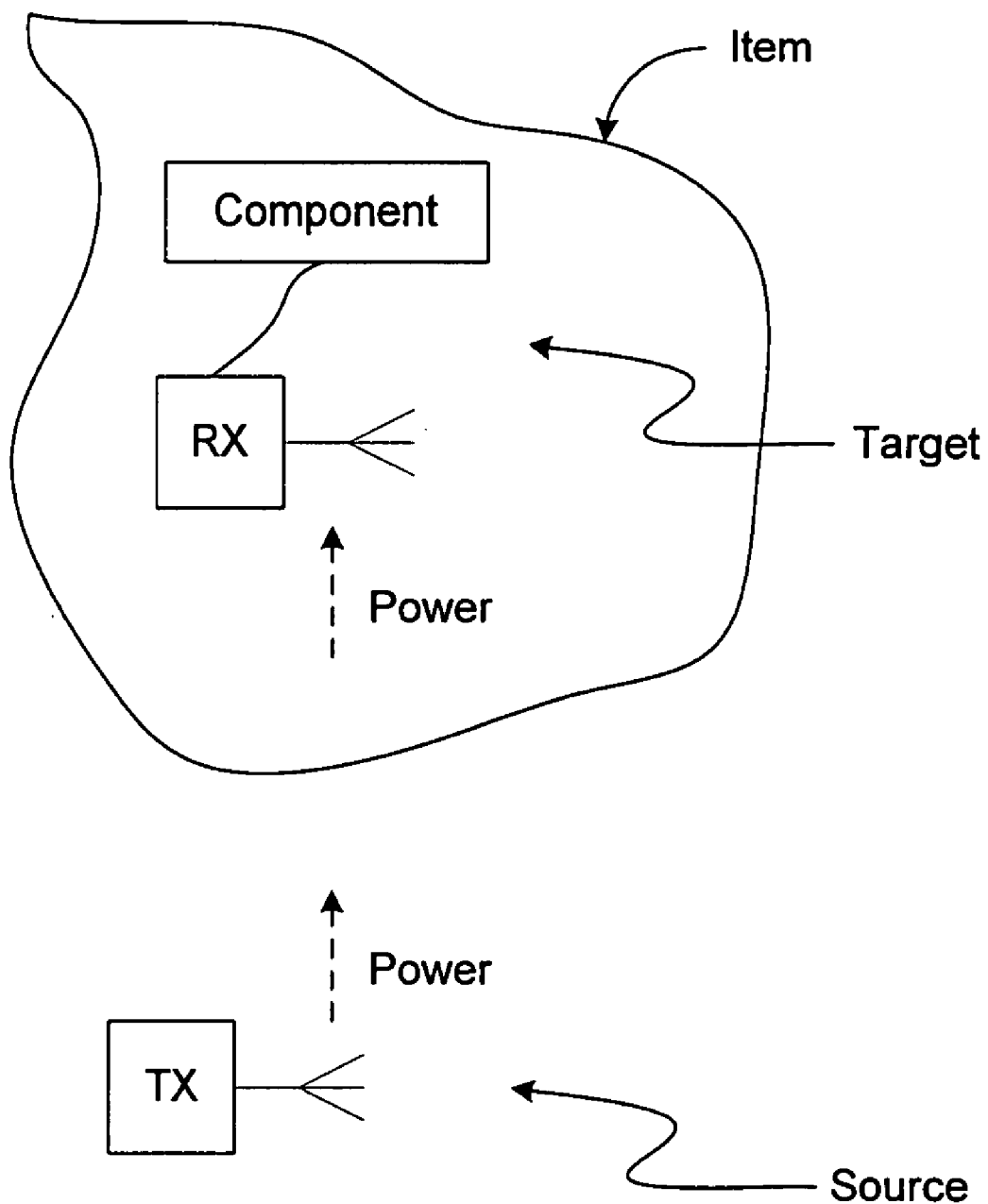
FIG. 1 is an illustration of a first embodiment of a system for wirelessly powering an item according to the invention.

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention pertains to a system 10 for wirelessly powering an item 12. The system 10 comprises a source 14 configured to send wireless power. The system 10 comprises a target 16 configured to receive the wireless power and convert the wireless power to a useable power. The system 10 comprises a component 18 connected to and configured to receive the useable power from the target 16, wherein when the component 18 receives the usable power, the component 18 activates and the active component 18 can be sensed by a person.

The source 14 preferably includes a wireless power transmitter 20. Preferably, the source 14 includes a transmitting antenna 22. The source 14 can include a wired power source 24. The source 14 can operate on batteries 52. The wireless power transmitter 20 can pulse power wirelessly.

The target 16 preferably includes an RF power receiver 26. Preferably, the receiver 26 includes a power harvester 28. The harvester 28 preferably includes circuitry 30 to convert RF power into DC power. Preferably, the target 16 includes a receiving antenna 32. The target 16 can include a charge storage element 56 which stores power to supply to the component 18. There can be a housing 68 having a face 82, and the target 16 is a replaceable unit 84 that fits in the face 82.

The component 18 can include a light 34. There can be a switch 46 which controls the light 34. The light 34 can be an LED 54. The component 18 can have movable parts 74. The component 18 can produce sound. The component 18 can include a speaker 64. The component 18 can include a driver 66 to control the speaker 64.

The component 18 can include a speaker 64. The component 18 can include a driver 66 to control the speaker 64. The component 18 can produce a scent. The component 18 can include a changeable surface 40. The target 16 and the component 18 can be incorporated into the item 12.

The item 12 can be an ornament 36. The item 12 can have a snowflake shape 38 or an orb shape 80. The snowflake shape 38 or orb shape 80 can be configured to hang in or on a surface 40. The surface 40 is a window 42.

There can be one or more additional sources 14. The source 14 and the one or more additional sources 14 are preferably connected. The source 14 and the one or more additional sources 14 can be connected in series. The source 14 and the one or more additional sources 14 can be connected in parallel.

There can be one or more additional targets 16. The target 16 and the one or more additional targets 16 are preferably connected.

There can be one or more additional components 18. The component 18 and the one or more additional components 18 are preferably connected.

There can be one or more controllers 44 electrically connected to the system 10 to control the system 10.

There can be one or more switches 46 electrically connected to the system 10 to aid with control the system 10.

The source 14 can include an attachment mechanism 48 for attaching to a structure 50. The target 16 can include an attachment mechanism 48 for attaching to a structure 50. The component 18 can include an attachment mechanism 48 for attaching to a surface 40.

There can be means for activating the component 18. The activating means can include a switch 46 that passes or accepts power to the component 18. The activating means can include a voltage sensor 58 such that when a predetermined voltage level is reached, the switch 46 is activated to allow power to flow to the component 18. The activating means can include a timer 60 to control activation of the switch 46. The activating means can include a button 62 to control activation of the switch 46.

The present invention pertains to an ornament 36. The ornament 36 comprises a housing 68 preferably having a snowflake shape 38 or an orb shape 80 or a jack-o-lantern shape a candy shape. The ornament 36 comprises a receiving antenna 32 in contact with a housing 68. The ornament 36 comprises a wireless RF energy harvester 28 disposed in the housing 68 that receives wireless energy and converts it into DC. The ornament 36 comprises a plurality of LEDs 54 disposed in the housing 68 electrically connected to and powered by the harvester 28.

The housing 68 can have a plurality of faces 82 that are interchangeable on the housing 68, the faces 82 being the snowflake shape 38, the orb shape 80 or the jack-o-lantern shape or a candy shape. Alternatively, the housing 68 has a face 82, and the receiving antenna 32 and the harvester 28 form a unit 84 that has snaps 86 which snap into the face 82.

The present invention pertains to a Christmas tree 70. The tree 70 comprises a structure 50 having a trunk and branches. The tree 70 comprises a plurality of ornaments 36 which are held by the structure 50. Each ornament 36 having a receiving antenna 32, a wireless RF power harvester 28 connected to the receiving antenna 32 which converts RF wireless energy into DC, and at least one LED 54 electrically connected to and powered by the harvester 28. The tree 70 comprises an RF transmitter 20 which transmits wireless RF energy to the ornaments 36 and in electrical communication with the ornaments 36. There can be an urn from which the structure 50 extends.

The present invention pertains to an assembly. The assembly comprises a system 10 for wirelessly powering a component 18. The assembly comprises a structure 50 for supporting the system 10. The system 10 includes a source 14 configured to send wireless power. The system 10 includes a target 16 electrically connected to the component 18 and configured to receive the wireless power, to convert the wireless power to a useable power, and to activate a component 18 using the useable power.

The present invention pertains to an item 12 that is wirelessly powered. The item 12 comprises a target 16 configured to receive wireless power and convert the wireless power to a useable power. The item 12 comprises a component 18 connected to and configured to receive the useable power from the target 16, wherein when the component 18 receives the usable power, the component 18 activates, and the active component 18 can be sensed by a person.

The present invention pertains to a method for wirelessly powering an item 12 comprising the steps of sending wireless power from a source 14. There is the step of receiving the wireless power at a target 16. There is the step of converting the wireless power to a useable power at the target 16. There is the step of receiving the useable power from the target 16 at a component 18 connected to the target 16. There is the step of activating by the component 18 when the component 18 receives the usable power, wherein the active component 18 can be sensed by a person.

The present invention pertains to a structure 50 for supporting. The structure 50 comprises a base. The structure 50 comprises an element extending from the base having a first portion through which at least one wireless power transmitter 20 is attached to the element, and a second portion through which at least one target 16 configured to receive the wireless power and convert the wireless power to a useable power is attached to the element.

The present invention pertains to a system 10 for wirelessly power an item 12 attached to a tree 70. The system 10 comprises a source 14 configured to send wireless power. The system 10 comprises at least one target 16 configured to receive the wireless power and convert the wireless power to a useable power wherein the at least one target 16 is attached to the tree 70. The tree 70 can be real or artificial.

In regard to the description of the operation of the invention the following U.S. patents and patent applications are incorporated by reference.

| | |
|---|---|
| FFPT-1 | wireless power supply - U.S. Pat. No. 7,027,311 |
| FFPT-2 | pulsing - U.S. Patent Application No. 11/356,892 |
| FFPT-3 | network - U.S. Patent Application No. 11/438,508 |
| FFPT-6 | High Efficiency Rectification - U.S. Patent Application No. 11/584,983 |
| FFPT-8 | pulsing CIP - U.S. Patent Application No. 11/651,818 |
| FFPT-9 | network CIP - U.S. Patent Application No. 11/699,148 |
| FFPT-13 | series network - U.S. Patent Application No. 11/881,203 |

A system 10 for wirelessly powering an item 12, comprising a source 14 configured to send wireless power; and a target 16 configured to receive the wireless power and convert the wireless power to a useable power; and a component 18 connected to and configured to receive the useable power from the target 16, wherein when the component 18 receives the usable power, the component 18 activates.

The system 10 wherein the source 14 includes an RF power transmitter 20.

The system 10 wherein the source 14 further includes a transmitting antenna 22. The system 10 wherein the source 14 further includes a wired power source 24.

The system 10 wherein the target 16 includes an RF power receiver 26. The system 10 wherein the RF power receiver 26 includes a power harvester 28. The system 10 wherein the power harvester 28 includes circuitry 30 configured to convert RF power into DC power. The system 10 wherein the target 16 further includes a receiving antenna 32.

The system 10 wherein the component 18 includes a light 34.

The system 10 wherein the component 18 has moveable parts.

The system 10 wherein the component 18 produces a sound.

The system 10 wherein the component 18 produces a scent.

The system 10 wherein the component 18 includes a changeable surface 40 characteristic.

The system 10 wherein the target 16 and the component 18 are incorporated into the item 12. The system 10 wherein the item 12 is an ornament 36. The system 10 wherein the item 12 is a snowflake. The system 10 wherein the snowflake is configured to hang in or on a surface 40. The system 10 wherein the surface 40 is a window 42.

The system 10 further including one or more additional sources 14. The system 10 wherein the source 14 and the one or more additional sources 14 are connected. The system 10 wherein the source 14 and the one or more additional sources 14 are connected in series. The system 10 wherein the source 14 and the one or more additional sources 14 are connected in parallel.

The system 10 further including one or more additional targets 16. The system 10 wherein the target 16 and the one or more additional targets 16 are connected.

The system 10 further including one or more additional components 18. The system 10 wherein the component 18 and the one or more additional components 18 are connected.

The system 10 further including one or more controllers 44 electrically connected to the system 10 to control the system 10.

The system 10 further including one or more switches 46 electrically connected to the system 10 to aid with control of the system 10.

The system 10 wherein the source 14 includes an attachment mechanism 48 for attaching to a structure 50.

The system 10 wherein the target 16 includes an attachment mechanism 48 for attaching to a structure 50.

The system 10 wherein the component 18 includes an attachment mechanism 48 for attaching to a surface 40.

An assembly comprising a system 10 for wirelessly powering a component 18; and a structure 50 for supporting the system 10, wherein the system 10 includes: a source 14 configured to send wireless power; and a target 16 electrically connected to the component 18 and configured to receive the wireless power, to convert the wireless power to a useable power, and to activate a component 18 using the useable power.

The assembly wherein the structure 50 is a tree 70.

The assembly further including a unit 84 incorporating the component 18. The assembly wherein the unit 84 further incorporates the target 16. The assembly wherein the unit 84 is an ornament 36.

The assembly wherein the source 14 is positionable near a base of the structure 50.

The assembly wherein the target 16 is positionable on the structure 50.

The assembly further including one or more additional sources 14.

The assembly further including one or more additional targets 16.

The assembly further including one or more additional components 18.

Referring to FIG. 1, a system 10 for wirelessly powering an item 12, according to the present invention, includes a source 14 for sending wireless power, a target 16 for receiving the wireless power and converting the wireless power into useable power, and a component 18 configured to receive and use the useable power.

The item 12 includes the component 18 or a plurality of components 18. The item 12 may be any specialty item 12 that requires power for the component 18 to activate. For example, the item 12 may be a decoration, a prop, a display, an accent, etc. The item 12 may be holiday or theme-related (e.g., Christmas, Easter, wedding, birthday). Activation of the component 18 may result in the production of a sensory change in the item 12, for example, light 34 (sight), motion, sound, scent, taste, or touch (feel).

The item 12 may include a mechanism for hanging, mounting, or otherwise displaying the item 12. For example, the mechanism may be a clip, an aperture, etc.

The source 14 preferably includes a radio frequency (RF) power transmitter 20 connected to a transmitting antenna 22. The RF power transmitter 20 generates RF power and supplies the RF power to the transmitting antenna 22. The transmitting antenna 22 radiates the RF power over a distance of space. The RF power transmitter 20 and the transmitting antenna 22 may be of any design that accomplishes the objectives of the invention (i.e., radiating RF power/energy to a target 16). The RF power transmitter 20 and the transmitting antenna 22 may be connected through any suitable means.

The source 14 may operate on batteries 52. Alternatively, referring to FIGS. 2-5, the source 14 may be electrically connected to a wired power source 24, for example, connected via a cord to a plug for plugging into a standard alternating current (AC) outlet. In this configuration, the RF power transmitter 20 converts AC power to the RF power for transmission from the transmitting antenna 22. An external AC to direct current (DC) converter may be included to convert the AC power to DC power, so that the RF power transmitter 20 then converts the DC power into the RF power.

One or more additional sources 14 (or portions thereof) may be included in the system 10. The sources 14 may be electrically connected to each other in any suitable manner to achieve a desired result. The sources 14 may be electrically connected in series or in parallel.

Figure 2:
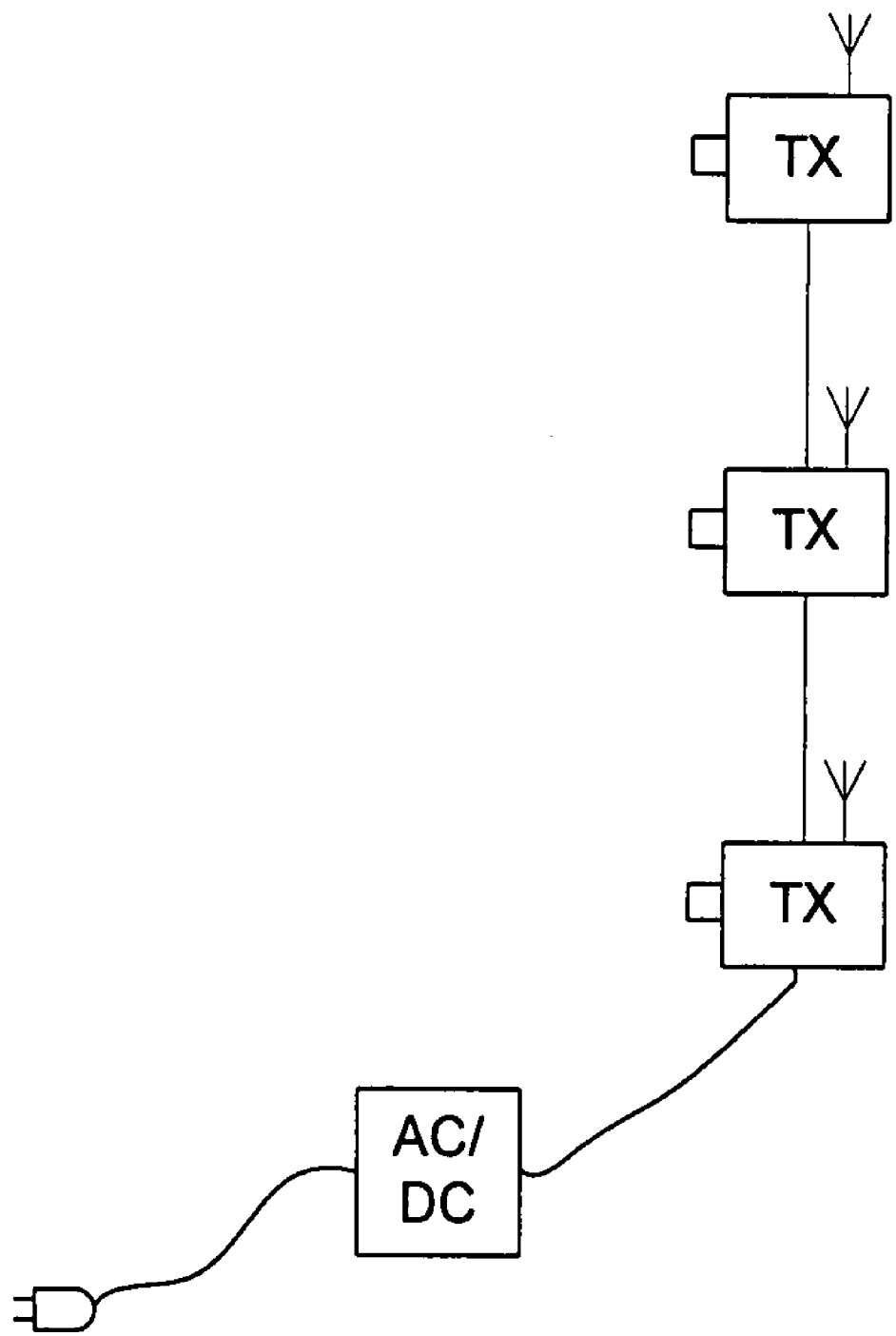
FIG. 2 is an illustration of a first embodiment of a source according to the present invention.
Figure 3:
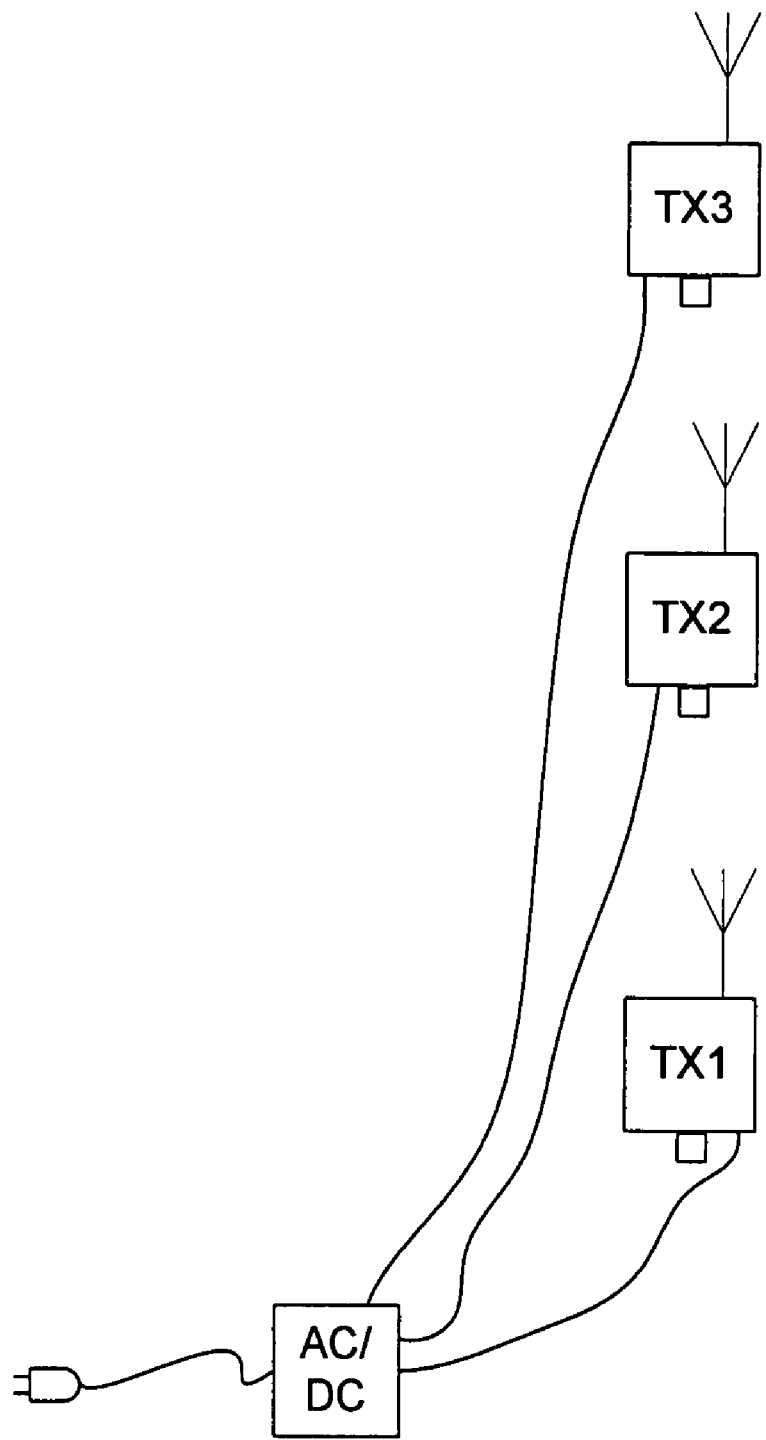
FIG. 3 is an illustration of a second embodiment of a source according to the present invention.

For example, one or more RF power transmitters 20, each with an associated transmitting antenna 22, may be included. FIG. 2 illustrates a plurality of RF power transmitters 20 connected in series, where each RF power transmitter 20 is connected to a transmitting antenna 22. FIG. 3 illustrates a plurality of RF power transmitters 20 connected in parallel, where each RF power transmitter 20 is connected to a transmitting antenna 22.

Figure 4:
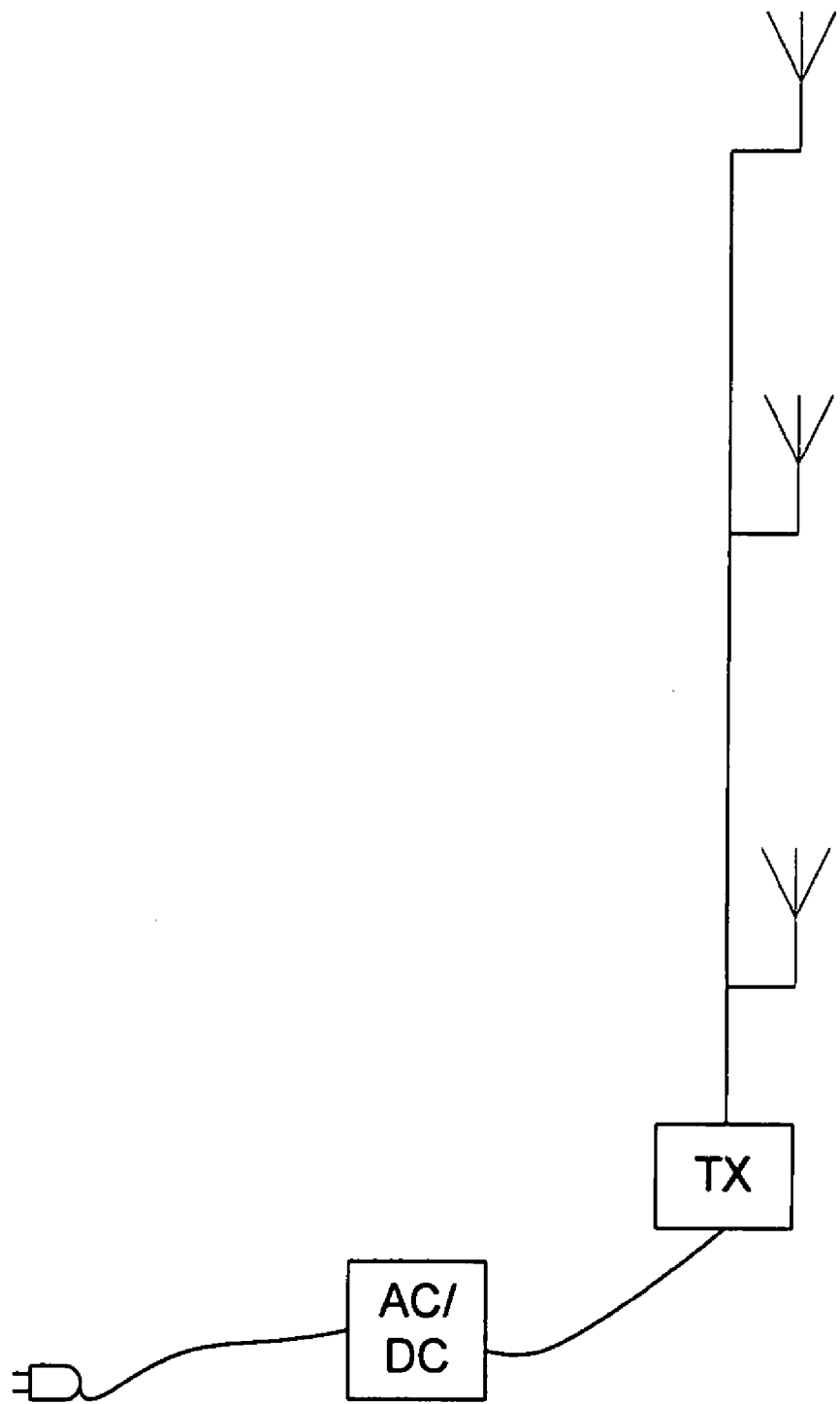
FIG. 4 is an illustration of a third embodiment of a source according to the present invention.
Figure 5:
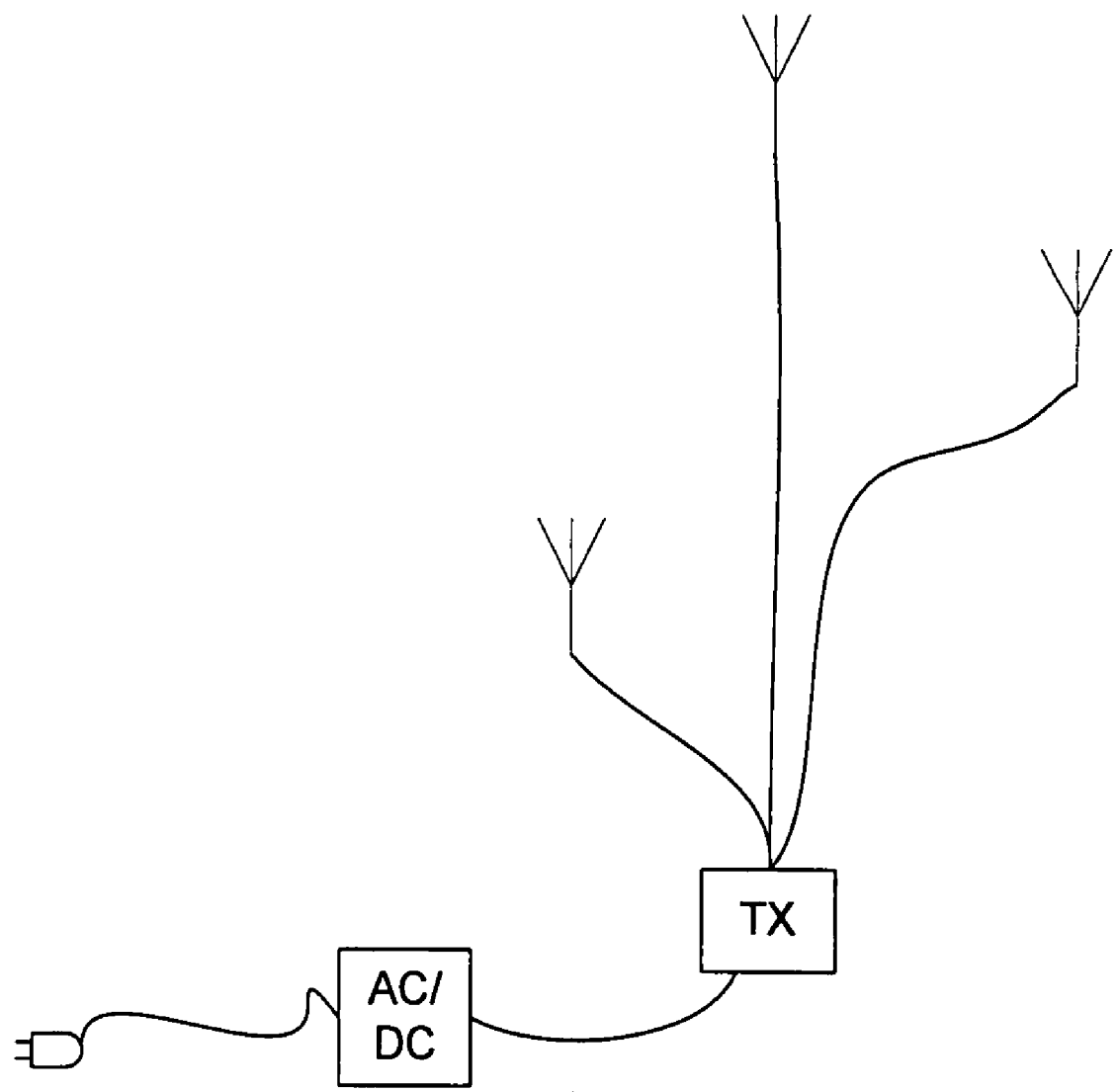
FIG. 5 is an illustration of a fourth embodiment of a source according to the present invention.

Likewise, for example, FIG. 4 illustrates one RF power transmitter 20 connected to a plurality of transmitting antennas 22, where the transmitting antennas 22 are connected in series. FIG. 5 illustrates one RF power transmitter 20 connected to a plurality of transmitting antennas 22, where the transmitting antennas 22 are connected in parallel.

Referring to FIG. 1, the target 16 preferably includes an RF power receiver 26 connected to a receiving antenna 32. The receiving antenna 32 receives the radiated RF power (from the transmitting antenna(s) 22) and supplies the RF power to the RF power receiver 26. The RF power receiver 26 converts the RF power into a useable power (form) that is utilizable by the component 18. For example, the component 18 may require AC or DC power, or a combination of the two, for activation.

The RF power receiver 26 and the receiving antenna 32 may be of any design that accomplishes the objectives of the invention (i.e., receiving radiated RF power/energy from a source 14). The RF power receiver 26 and the receiving antenna 32 may be connected through any suitable means.

The RF power receiver 26 preferably includes an RF power harvester 28 for converting RF power to DC power. RF power harvesters (methods and apparatuses for high efficiency rectification for various loads) which are suitable for use with the present invention have been discussed in detail in U.S. patent application Ser. No. 11/584,983, which is incorporated herein by reference.

Figure 18:
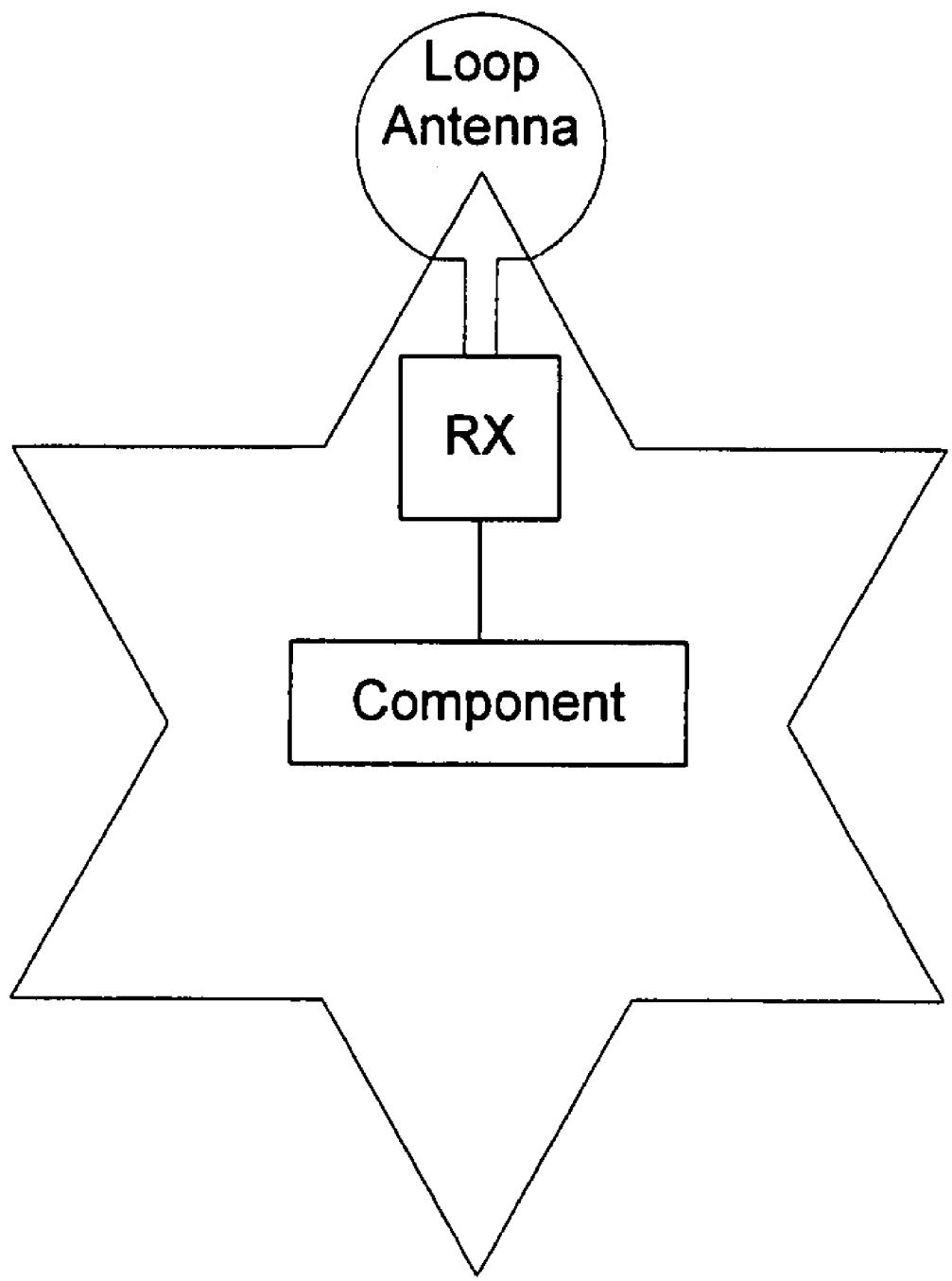
FIG. 18 is an illustration of a first embodiment of an item according to the present invention.

The receiving antenna 32 may be incorporated into the item 12 itself. For example, the receiving antenna 32 may be inside the item 12, part of the item 12, or outside the item 12. The receiving antenna 32 may be incorporated into the mechanism for hanging, mounting, or otherwise displaying the item 12. For example, a loop for hanging the item 12 may be a portion of or the entire receiving antenna 32, as shown in FIG. 18 where the loop for hanging is also a loop antenna connected to the receiver 26.

One or more additional targets 16 (or portions thereof) may be included in the system 10. The targets 16 may be electrically connected to each other in any suitable manner to achieve a desired result. The targets 16 may be electrically connected in series or in parallel.

Figure 6:
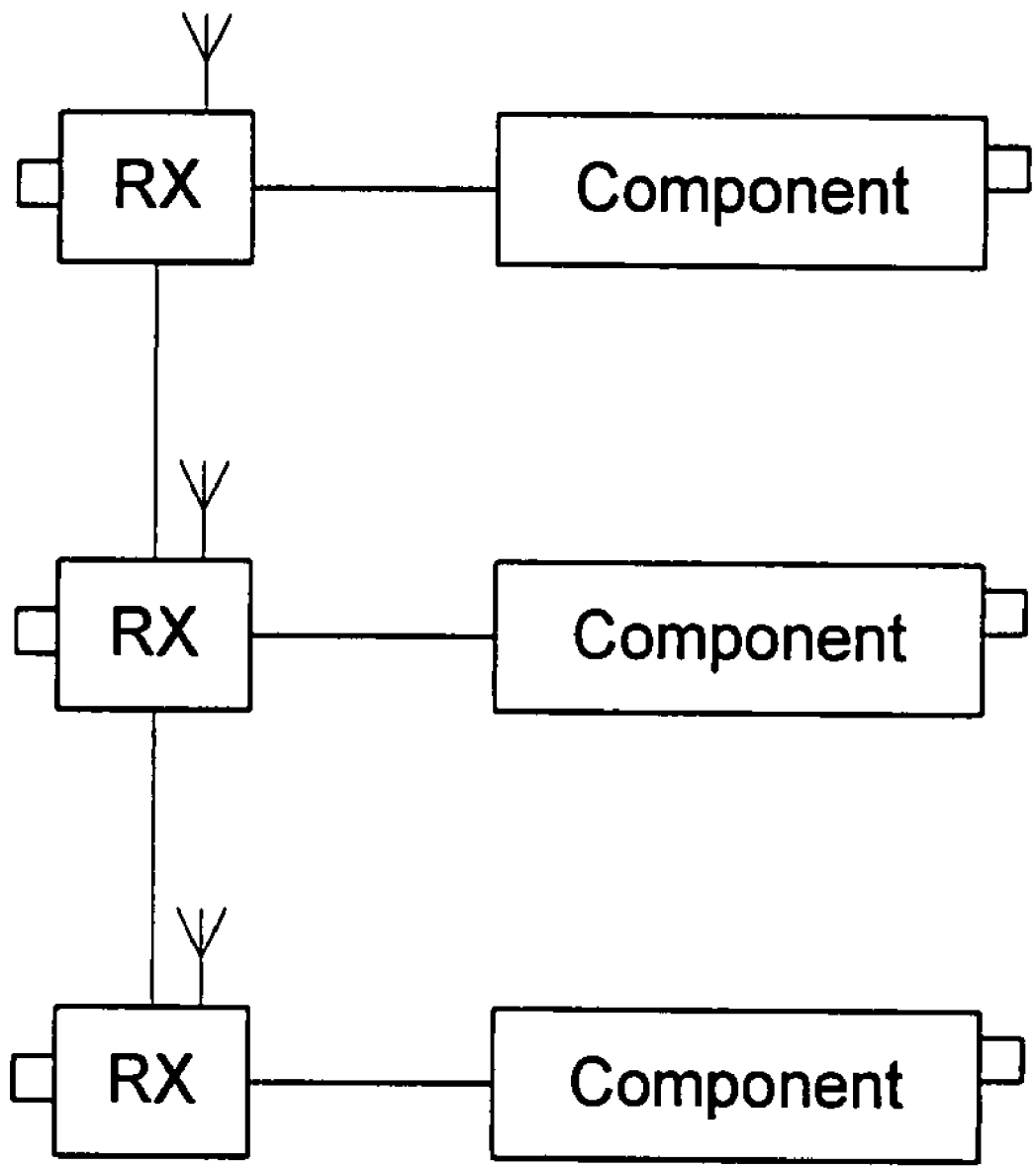
FIG. 6 is an illustration of a first embodiment of a target according to the present invention.
Figure 7:
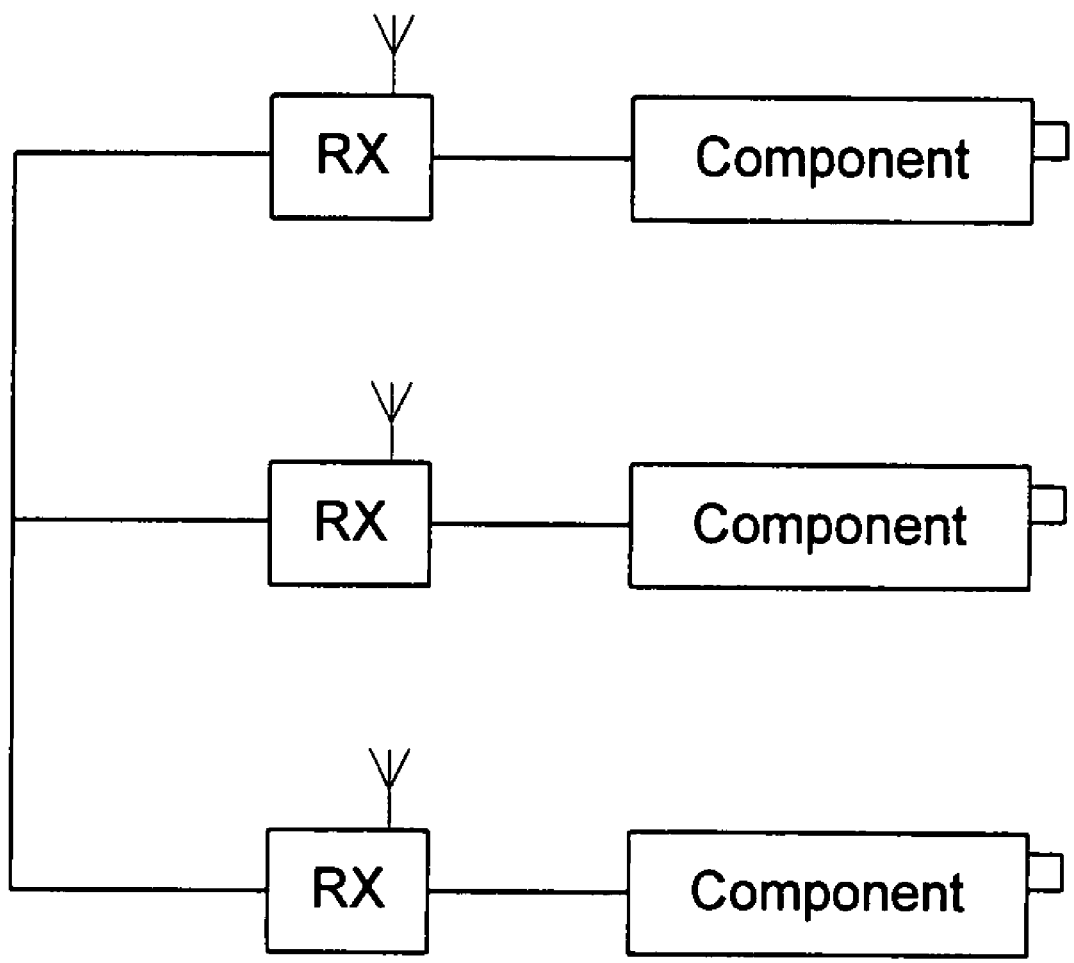
FIG. 7 is an illustration of a second embodiment of a target according to the present invention.

For example, one or more RF power receivers 26, each with an associated receiving antenna 32, may be included. FIG. 6 illustrates a plurality of RF power receivers 26 connected in series, where each RF power receiver 26 is connected to a receiving antenna 32. FIG. 7 illustrates a plurality of RF power receivers 26 connected in parallel, where each RF power receiver 26 is connected to a receiving antenna 32. In either case, the advantage is more uniform power distribution to the multiple components 18. As an example, one receiver 26 may be in a different polarization or located in a dead spot. The result may be a reduced power output for that receiver 26. The other receivers 26, however, may be receiving sufficient power and may supply some of that power to any other receiver 26 receiving less power.

Figure 8:
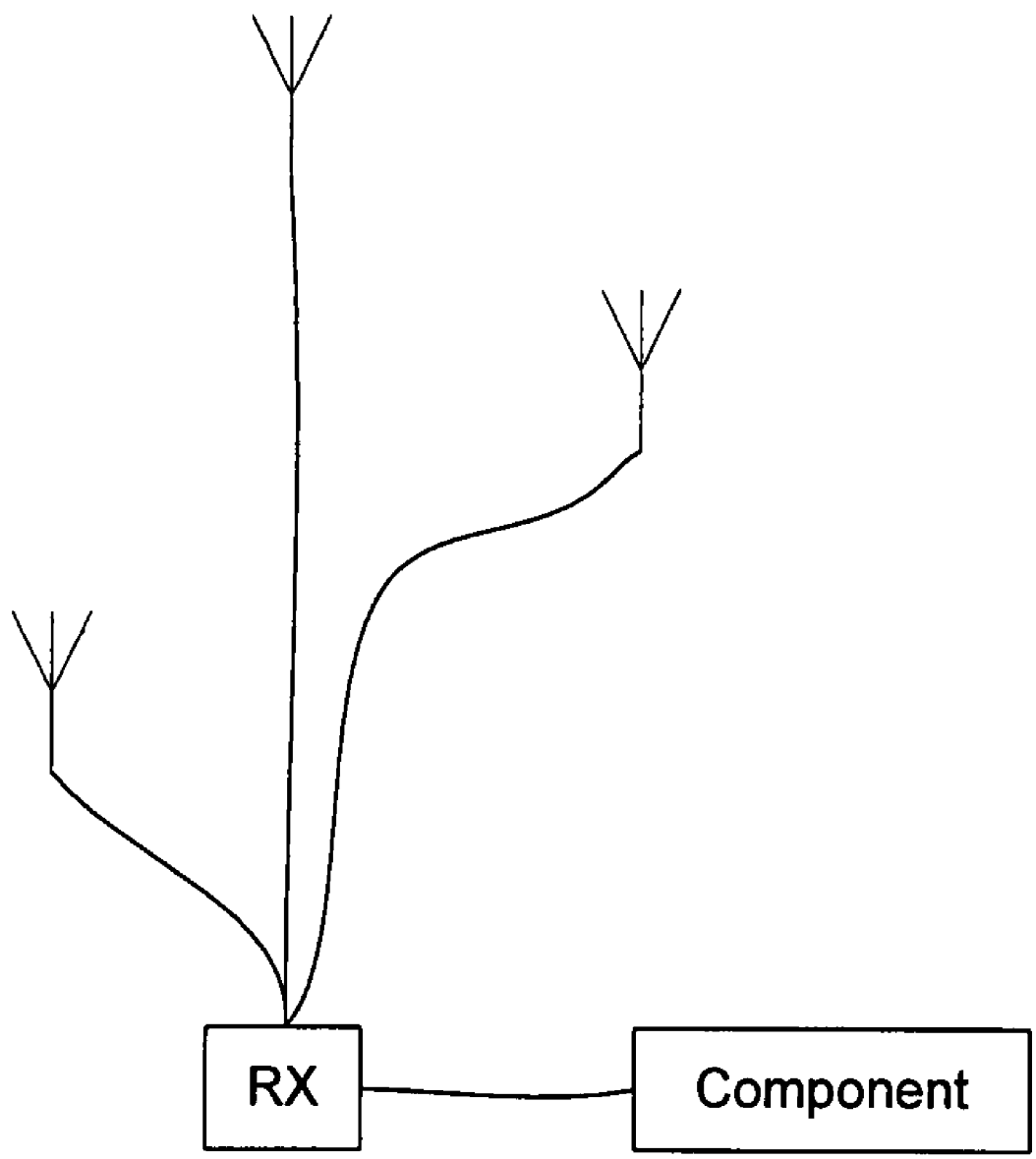
FIG. 8 is an illustration of a third embodiment of a target according to the present invention.
Figure 9:
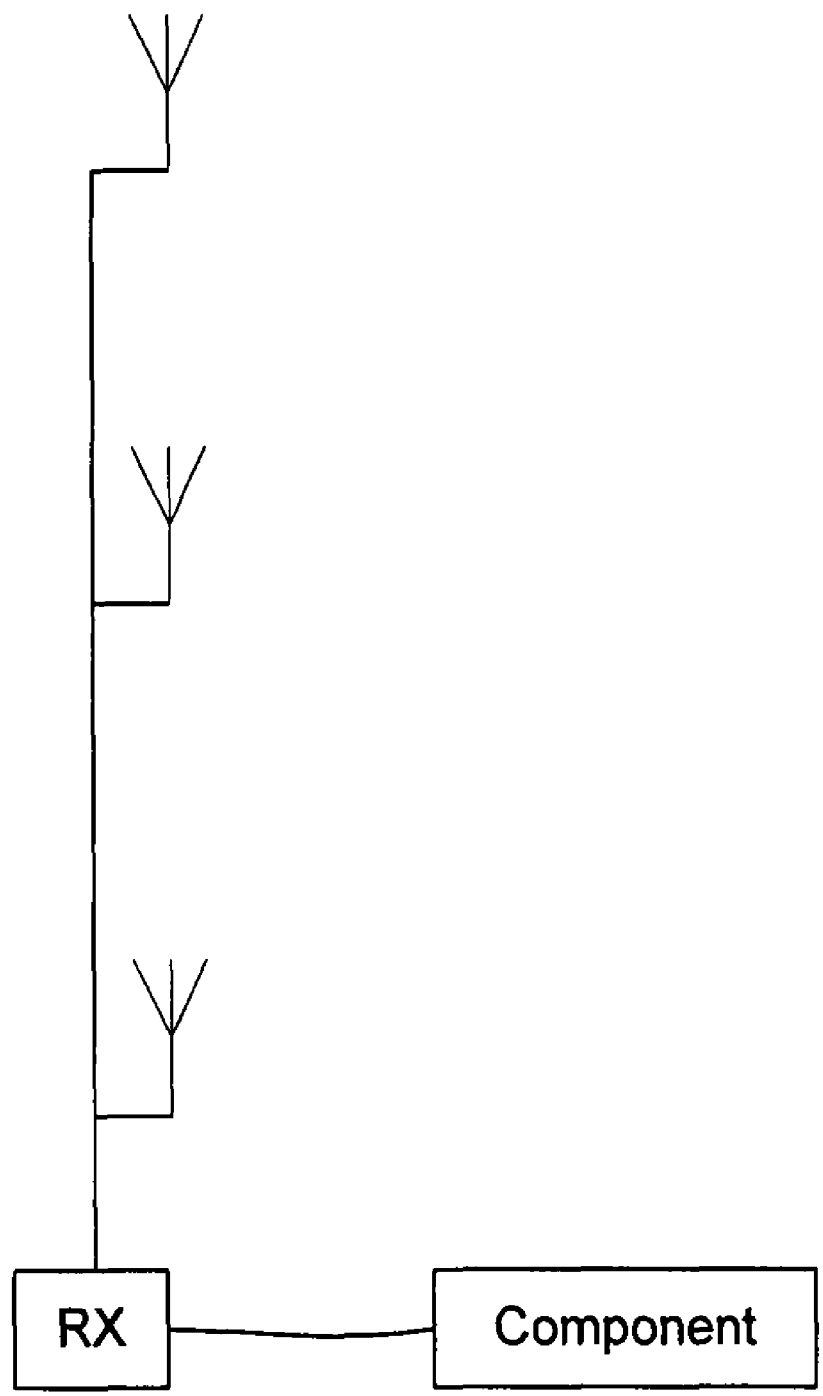
FIG. 9 is an illustration of a fourth embodiment of a target according to the present invention.

Likewise, for example, FIG. 8 illustrates one RF power receiver 26 connected to a plurality of receiving antennas 32, where the receiving antennas 32 are connected in parallel. FIG. 9 illustrates one RF power receiver 26 connected to a plurality of receiving antennas 32, where the receiving antennas 32 are connected in series. In either case, the advantages are increased power reception and increased probability of receiving sufficient power. As an example, one antenna may be in a different polarization or located in a dead spot. The result may be a reduced power output for that antenna. The other antennas, however, may be receiving sufficient power which is supplied to the receiver 26. It should be noted that the multiple antennas shown in any of the figures may be directly connected together or combined using a combiner or other combining device. Also, any type of antenna may be used with this or any other of the embodiments herein.

Referring to FIGS. 1 and 10-14, the component 18 is a part of or connected to the item 12. The component 18 may be anything that utilizes power for activation. Upon activation, the component 18 produces a result or desired outcome, such as a sensory change in the item 12. For example, the component 18 may use power to produce light 34, motion, sound, scent, taste, or tactile characteristics. To this end, the component 18 may be a light 34, an LED 54, a moveable part, a bell, etc. The component 18 may be configured to produce more than one characteristic.

Figure 10:
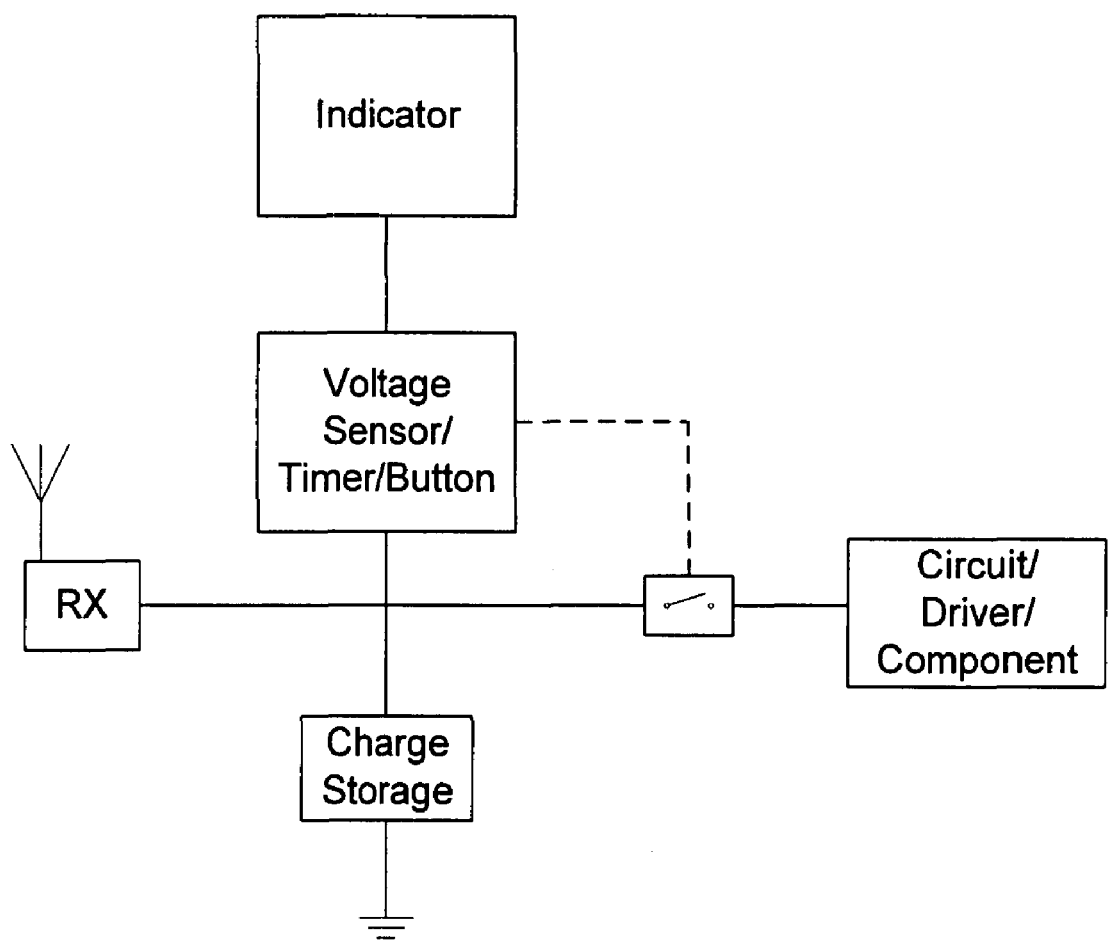
FIG. 10 is a fifth embodiment of a target according to the present invention.

Referring to FIG. 10, the target 16 may also include a charge storage component 18, means for activating the component 18, and a circuit or a driver 66, as appropriate. The charge storage component 18 stores power to supply to the component 18. The means for activating the component 18 controls the activation of the component 18. The means may include a switch 46 that passes or accepts power to the component 18. The means may also include a voltage sensor 58 such that when a pre-determined voltage level is reached, the switch 46 is activated to allow power to flow to the component 18. The means may alternatively include a timer 60 to control activation of the switch 46. The means may alternatively include a button 62 or other means to allow a user to control activation of the switch 46.

Figure 11:
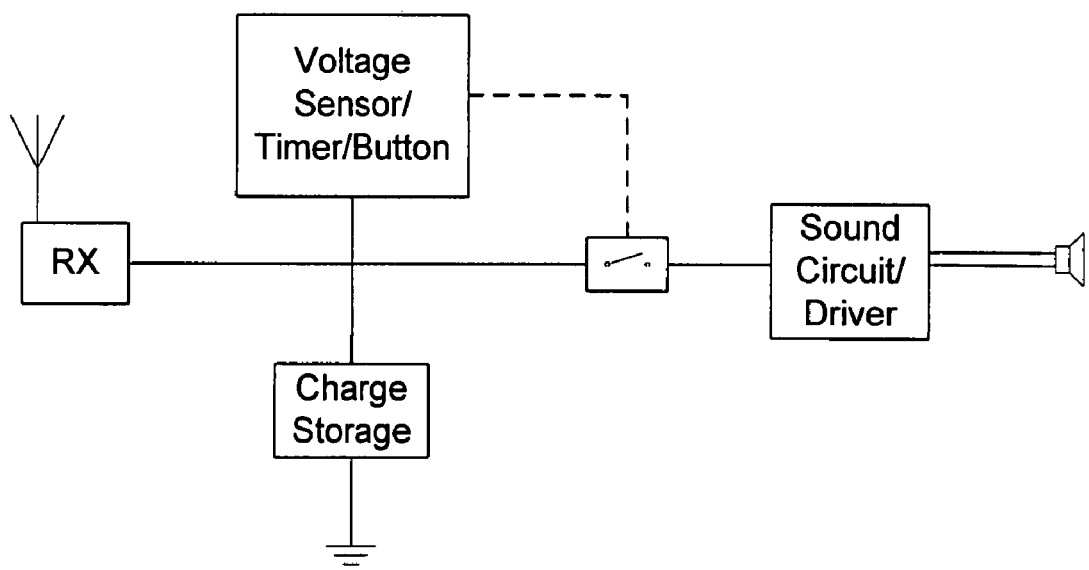
FIG. 11 is a sixth embodiment of a target according to the present invention.
Figure 12:
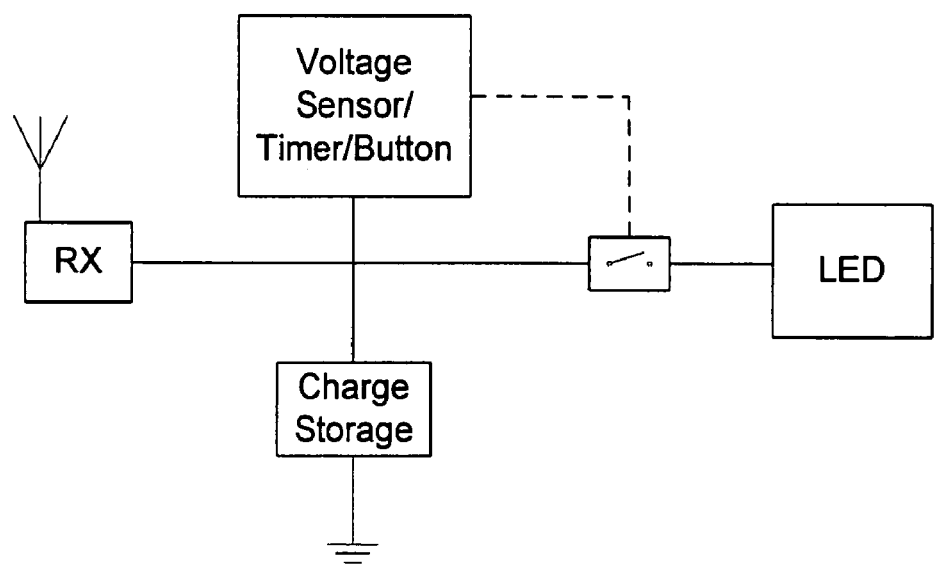
FIG. 12 is a seventh embodiment of a target according to the present invention.
Figure 13:
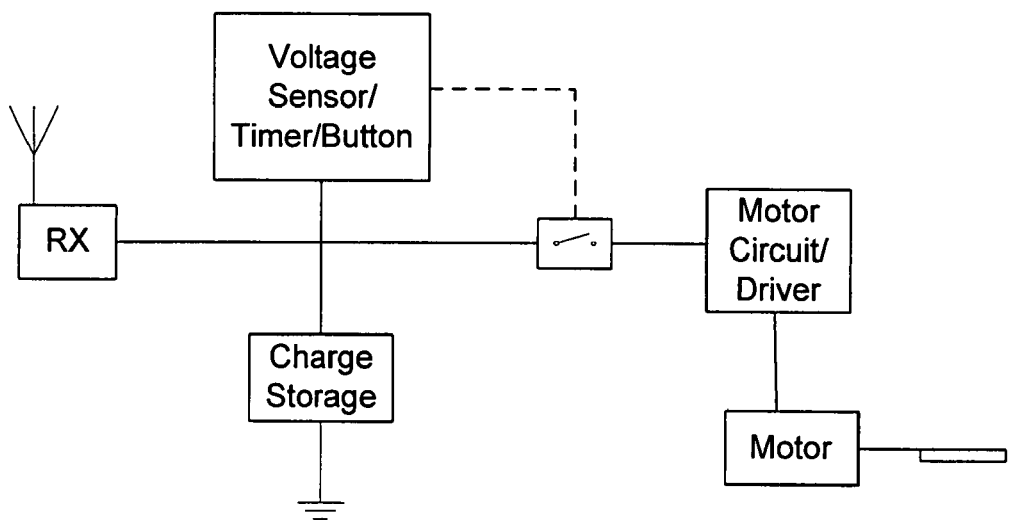
FIG. 13 is an eighth embodiment of a target according to the present invention.
Figure 14:
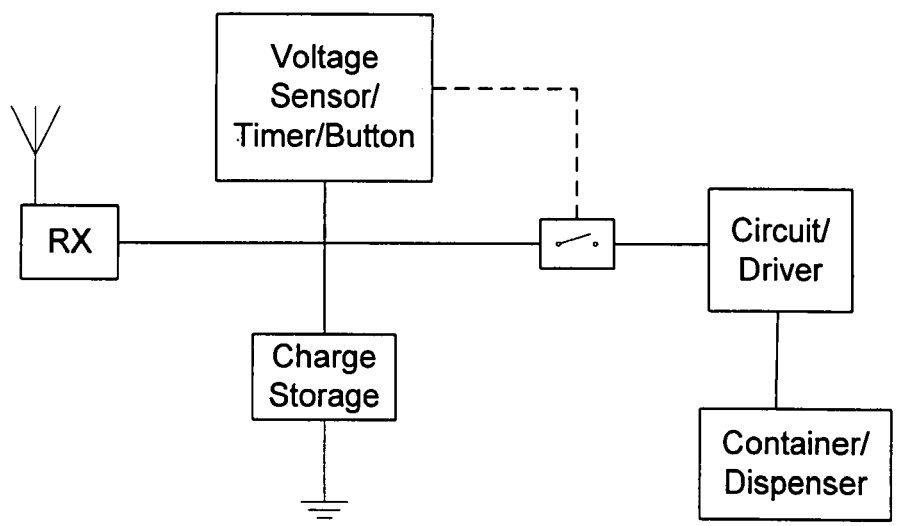
FIG. 14 is a ninth embodiment of a target according to the present invention.

Referring to FIG. 11, with a component 18 for sound, a sound circuit or driver 66 is included to control the operation of a speaker 64 or other sound producing device. Referring to FIG. 12, with a component 18 for light 34, an LED 54, or other light 34 producing device, is connected to the switch 46. The system 10 may be designed to blink the LED 54 on and off, and/or to dim and bright the LED 54. Referring to FIG. 13, with a component 18 for tactile characteristics, a motor 72 circuit or driver 66 is connected to the switch 46 and to a tactile motor 72. Referring to FIG. 14, with a component 18 for taste or smell, such as a container 76 for a liquid or gas having an associated dispenser 78 (for example, for passing flavored liquid into a drink or misting a scented gas into the air), a dispenser 78 circuit or driver 66 is connected to the switch 46 and the dispenser 78. It should be noted that with each of these embodiments, the switch 46, timers 60/button 62 or storage component 18 is preferred to be used, but not necessary to be used.

One or more additional components 18 may be included in the system 10. The one or more components 18 may be configured to work together to achieve a desired outcome. The components 18 and/or targets 16 may be electrically connected to each other in any suitable manner to achieve a desired result. The components 18 may be electrically connected in series or in parallel.

Figure 15:
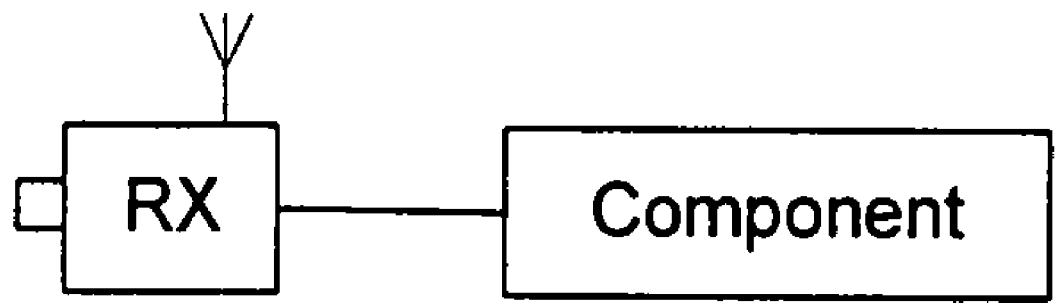
FIG. 15 is an illustration of a tenth embodiment of a target according to the present invention.
Figure 15:
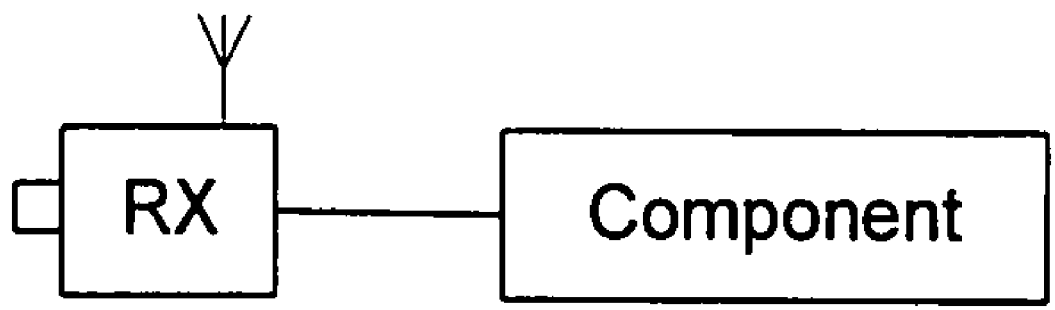
Figure 15:
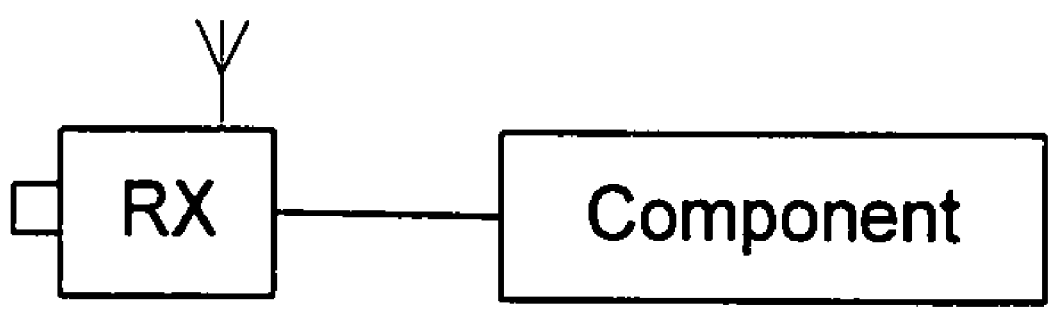

One or more components 18 may be individually utilized in the system 10. For example, FIG. 15 illustrates a plurality of components 18, where each component 18 is connected to one of a plurality of targets 16.

Figure 16:
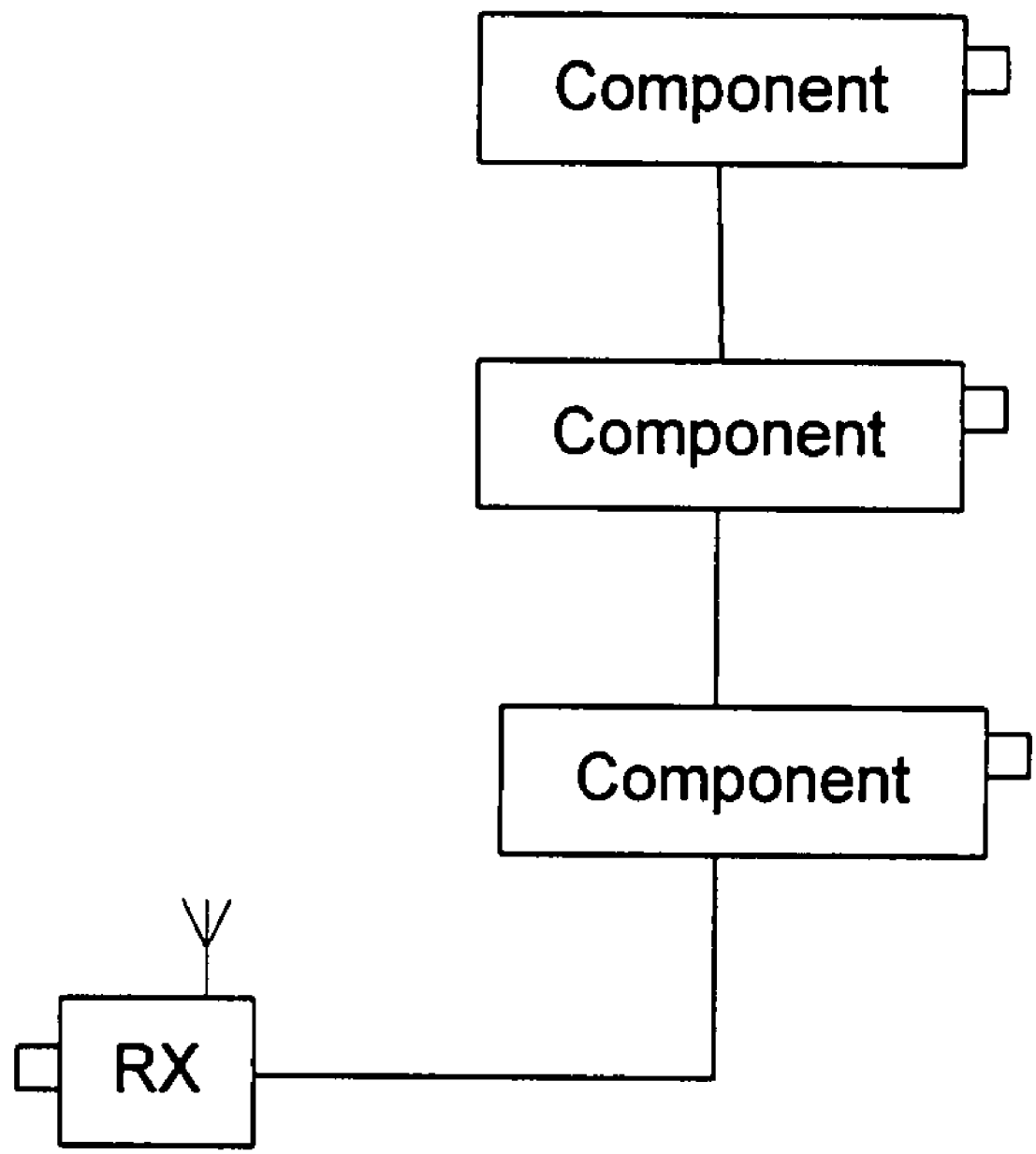
FIG. 16 is an illustration of a eleventh embodiment of a target according to the present invention.
Figure 17:
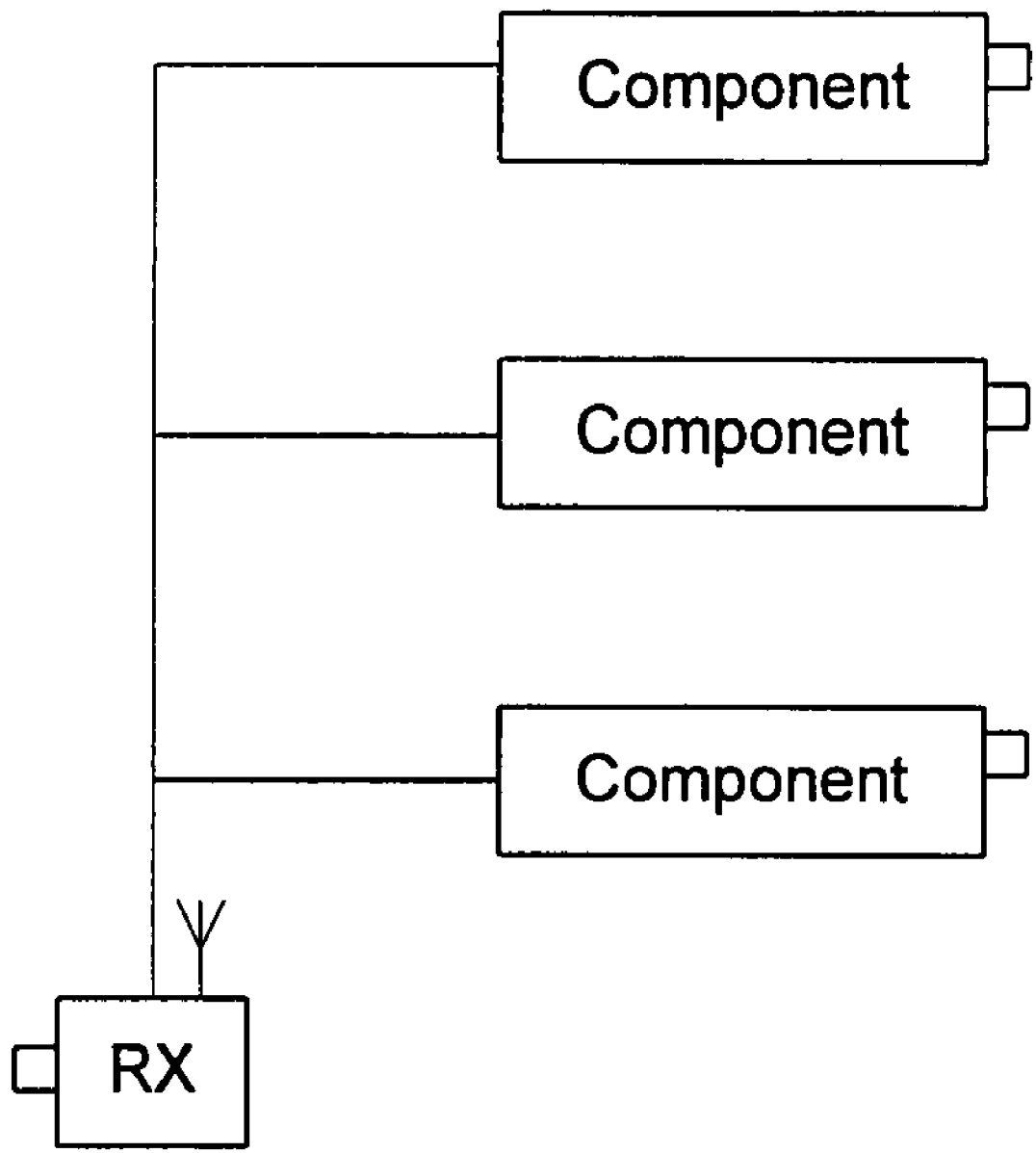
FIG. 17 is an illustration of an twelfth embodiment of a target according to the present invention.

One or more components 18 may be connected to a single target 16. For example, FIG. 16 illustrates a plurality of components 18 connected to one RF power receiver 26, where the components 18 are connected in series. FIG. 17 illustrates a plurality of components 18 connected to one RF power receiver 26, where the components 18 are connected in parallel.

Likewise, one or more components 18 may be connected to one or more targets 16. FIG. 6 illustrates a plurality of components 18 connected to a plurality of RF power receivers 26, where the RF power receivers 26 are connected in series. FIG. 7 illustrates a plurality of components 18 connected to a plurality of RF power receivers 26, where the RF power receivers 26 are connected in parallel.

Referring to FIG. 18, the component 18 and the target 16 may be incorporated into the item 12. The item 12 may be an ornament 36 for a holiday tree 70 (e.g., a lighted Christmas tree 70). As an example, a Christmas ornament 36 was retrofitted with an antenna and an RF energy harvesting circuit. The RF energy harvesting circuit was connected to a voltage sensor 58 and a switch 46. The voltage sensor 58 was implemented using a comparator and the switch 46 was implemented as a PMOS transistor. The PMOS transistor was connected to a music generating circuit that was connected to a speaker 64. The voltage sensor 58 was also connected to an indicator that informed the user that the ornament 36 had captured sufficient charge (stored in the charge storage component 18) to play a thirty second Christmas song. The indicator was implemented with an LED 54 that illuminated the nose of Rudolph the reindeer making the indicator not only informative but also decorative. When the ornament 36 had captured and stored sufficient charge to play the song, the comparator switched its output from the charge storage component 18 to the indicator and any additional captured energy was used to illuminate the indicator. The indicator informed the user that the ornament 36 was ready to play. The user could play the song by pressing a button 62 on the ornament 36. A block diagram of this system 10 can be seen in FIG. 10. The item 12 may also be a window 42 decoration (e.g., a lighted snowflake). As an example, a decorative snowflake was designed to hang in a window 42 using a suction cup or adhesive material. The snowflake was made from various materials including lexan and tempered glass. The center of the snowflake was removed to place in the receiver 26. The antenna was inserted into a milled slot that ran down the legs of the snowflake. Two configurations of receiver 26 were fabricated. Both used dipole antennas connected to an RF energy harvester 28. For the first receiver 26, six 30 degree LEDs 54 were connected to the output of the RF energy harvester 28 that was placed in the center of the snowflake. Each LED 54 was pointed down a branch of the snowflake. For the second receiver 26, a single 360 degree LED 54 was used in the center of the snowflake. The snowflake was fabricated in two ways. First, the plastic or glass was frosted. In this case, the entire snowflake would glow due to the diffraction caused by unsmooth surface 40. The second snowflake was clear with only the edges having a frosted finish due to the cutting process. In this case, the legs of the snowflake acted as light 34 pipes and almost all the light 34 exited the snowflake on the edges giving an outlined look. For certain snowflakes, opaque material in the shape of the snowflake was used on the front and back of the snowflake to hide the RF energy harvester 28 and antenna. One or more items 12 may be configured to work together to achieve a desired outcome (e.g., a light 34 or sound sequence). One or more items 12 may be electrically connected to each other to achieve the desired outcome.

The system 10 may be configured to pulse power. Pulsing networks were described in U.S. patent application Ser. No. 11/356,892 and U.S. patent application Ser. No. 11/651,818, both entitled Pulsing Transmission Network and incorporated herein by reference. Pulsing may be used to turn on and off any transmitting antenna 22 as desired. For example, each transmitting antenna 22 of the system 10 may be turned on then off sequentially.

Figure 19:
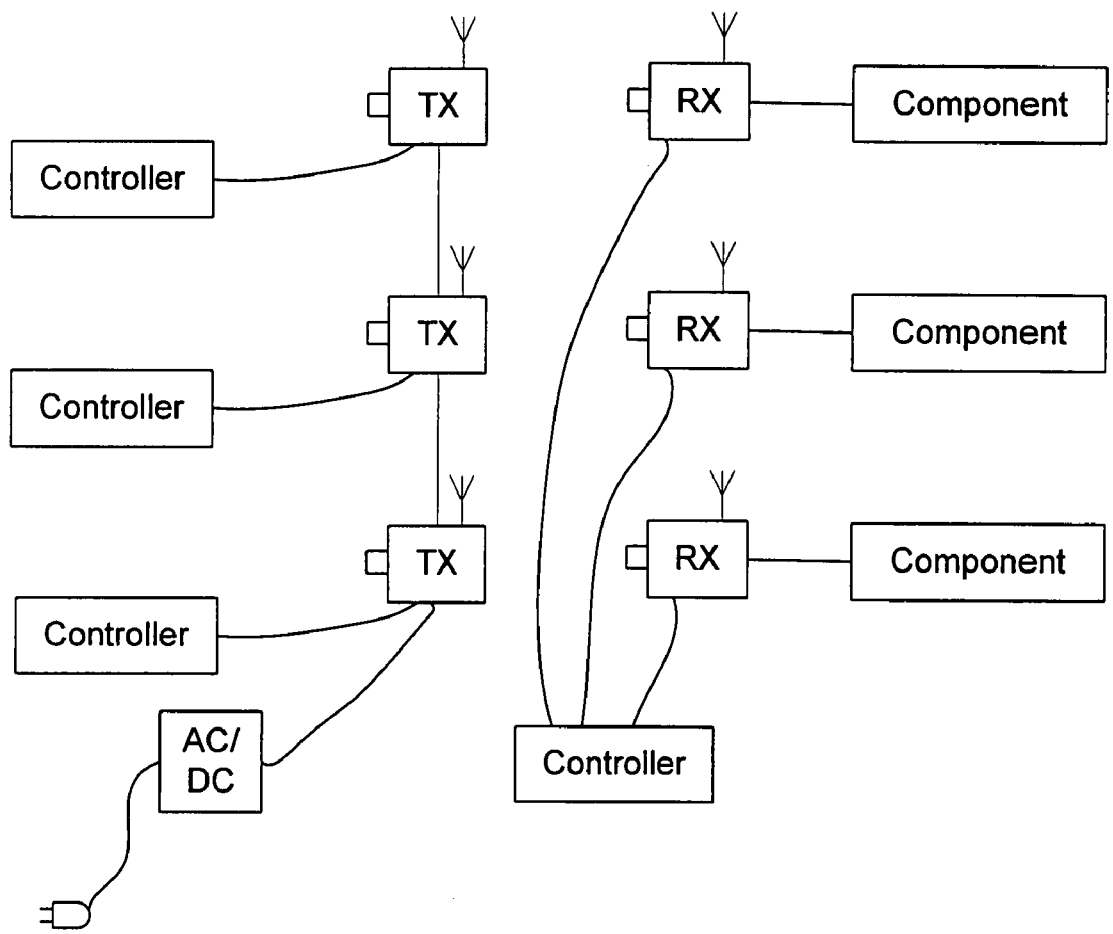
FIG. 19 is an illustration of a second embodiment of a system for wirelessly powering an item according to the present invention.

Referring to FIG. 19, a controller 44 may be incorporated into the system 10 to control a source 14, a target 16, a component 18, and/or an item 12 to achieve a desired outcome. One or more additional controllers 44 may be included. The one or more controllers 44 may be connected to one or more of the sources 14, targets 16, components 18, items 12, and/or each other. The controller 44 may be, but is not limited to, a microprocessor.

For example, a controller 44 may be used to pulse power by turning specific transmitting antennas 22 on and off. For another example, a controller 44 may be used to direct power to a particular target 16 via a particular source 14. The switch 46 may be, but is not limited to, a SPST or SPDT relay, pin diode switch, or a transistor such as a PMOS.

Figure 20:
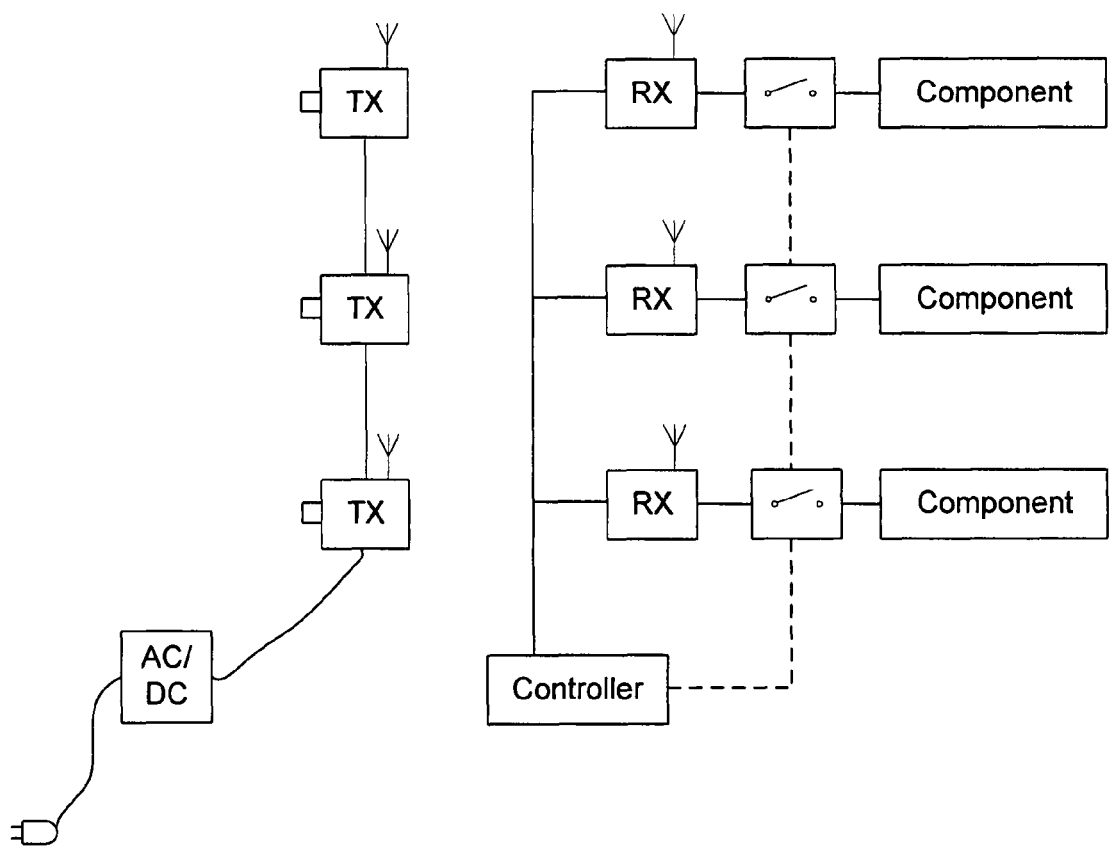
FIG. 20 is an illustration of a third embodiment of a system for wirelessly powering an item according to the invention including.

Referring to FIG. 20, a switch 46 may be incorporated into the system 10 to achieve a desired outcome. One or more additional switches 46 may be included. The one or more switches 46 may be connected to one or more of the sources 14, targets 16, components 18, items 12, controllers 44, and/or each other.

For example, a switch 46 may be used to pulse power by accepting and passing power at specific transmitting antennas 22. For another example, a switch 46 may be used to accept or pass power to a particular target 16 via a particular source 14. For another example, as illustrated in FIG. 15, a plurality of switches 46 may be used to turn components 18 on and off.

In the present invention, the system 10 may be made up of any embodiment source 14, any embodiment target 16, and any embodiment component 18. Each of the source 14, target 16, and component 18 (of multiples of each) may be configured to perform individually or collaboratively. Thus, the system 10 is flexible so that a wide variety of desired outcomes are achievable.

Thus, for a holiday light 34 application, the system 10 can be designed to have the lights 34 on constantly, to turn individual lights 34 on and off to create various patterns (blinking, sequences), to dim the lights 34, to change colors with different colored bulbs or LEDs 54. For a sound application, the system 10 can be designed to play various tunes by turning on and off the musical elements in the appropriate order and for the appropriate duration.

The system 10 may be configured to recirculate excess or unused power. Heat generated by the system 10 may be captured and used by other sub-assemblies of the system 10. For example, to heat a potpourri sub-assembly or to heat water in a base of a Christmas Tree 70 (for potpourri).

It should be noted that various other electrical components 18 may be added as required by the system 10 or as desired.

Figure 21:
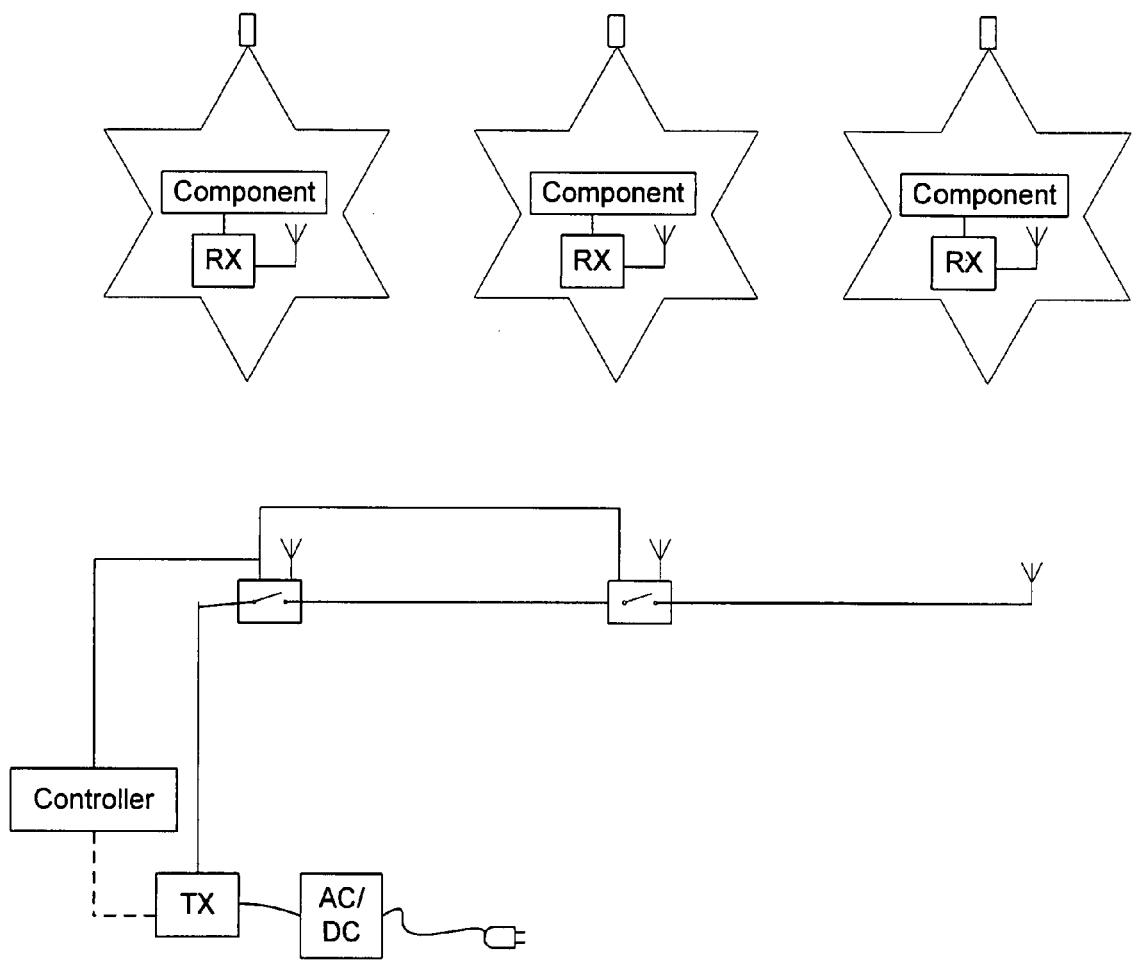
FIG. 21 is an illustration of a fourth embodiment of a system for wirelessly powering an item according to the invention.

For example, referring to FIG. 21, a system 10 according to the present invention for wirelessly powering a plurality of items 12 is illustrated. The system 10 includes a source 14, a plurality of targets 16, and a plurality of components 18.

In this example, each of the plurality of items 12 is an illuminating snowflake. Each of the plurality of items 12 includes a target 16, a component 18, and a mechanism for hanging the item 12.

The source 14 is connected to a plug that engages an AC outlet. AC power is supplied via the plug to an AC to DC converter. The AC to DC converter converts the AC power to DC power and supplies the DC power to an RF power transmitter 20. The RF power transmitter 20 converts the DC power to RF power and supplies the RF power to a plurality of transmitting antennas 22 via a plurality of switches 46. The controller 44 and the switches 46 direct the flow of power to the transmitting antennas 22. The transmitting antennas 22 transmit RF power over a distance to the targets 16.

Each target 16 includes a receiving antenna 32 and an RF power receiver 26. Each receiving antenna 32 receives the RF power sent by one or more transmitting antennas 22. Each receiving antenna 32 supplies the RF power to the RF power receiver 26 connected thereto. The RF power receiver 26 converts the RF power to DC power and supplies the DC power to the component 18.

In this example, each component 18 is an LED 54 for illuminating its associated snowflake. Each LED 54 receives DC power from the RF power receiver 26 and is activated or turned on.

Thus, in this example system 10, a single source 14 is utilized to send power wirelessly to a series of snowflakes, causing the snowflakes to light up. The controller 44 may be configured to vary the intensities or colors of the LEDs 54, vary the durations that the LEDs 54 are lit up, vary the sequence of LED 54 lighting among the group of snowflakes, etc. As an example, each snowflake may have a timing circuit or microprocessor that cycles through a sequence of different colors, intensities, and or durations. The sequence may be predetermined or random. The timer 60 may be synchronized by a pulsing waveform from the transmitter(s) 20. As an example, the transmitter(s) 20 may pulse the carrier frequency at 60 Hz (On-Off Key) for ten seconds. This ten-second period may be followed by a 1 second off period in order to reset the timers 60 in the receivers 26. The snowflakes may function from stored energy during this off period or may turn off with the transmitter 20.

Figure 22:
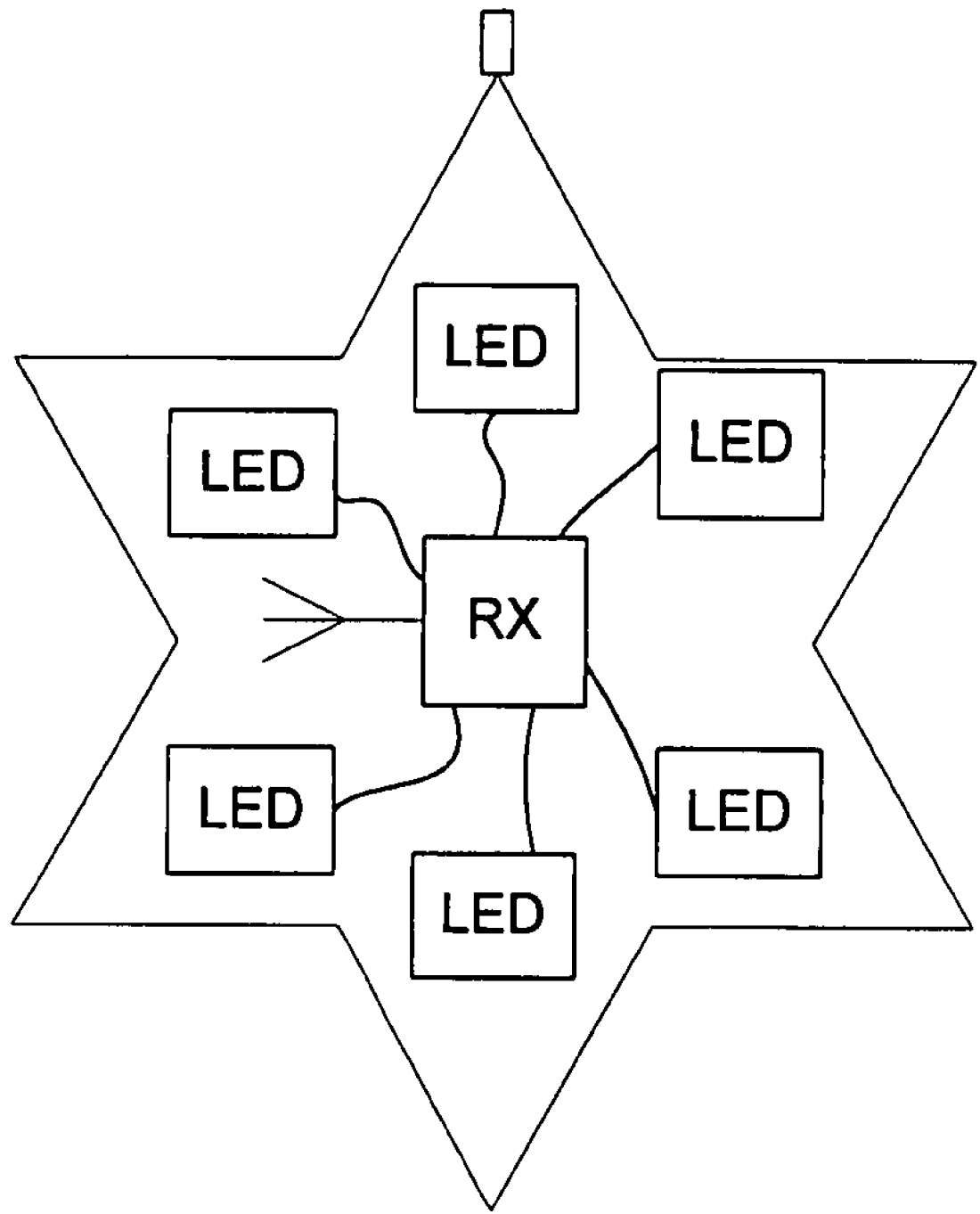
FIG. 22 is an illustration of a second embodiment of an item according to the present invention.

FIG. 22 shows another example of a snowflake suitable to be incorporated in the system 10 illustrated in FIG. 21. This snowflake includes a target 16 having a single RF power receiver 26, dual receiving antennas 32, and multiple components 18 (LEDs 54).

Figure 23:
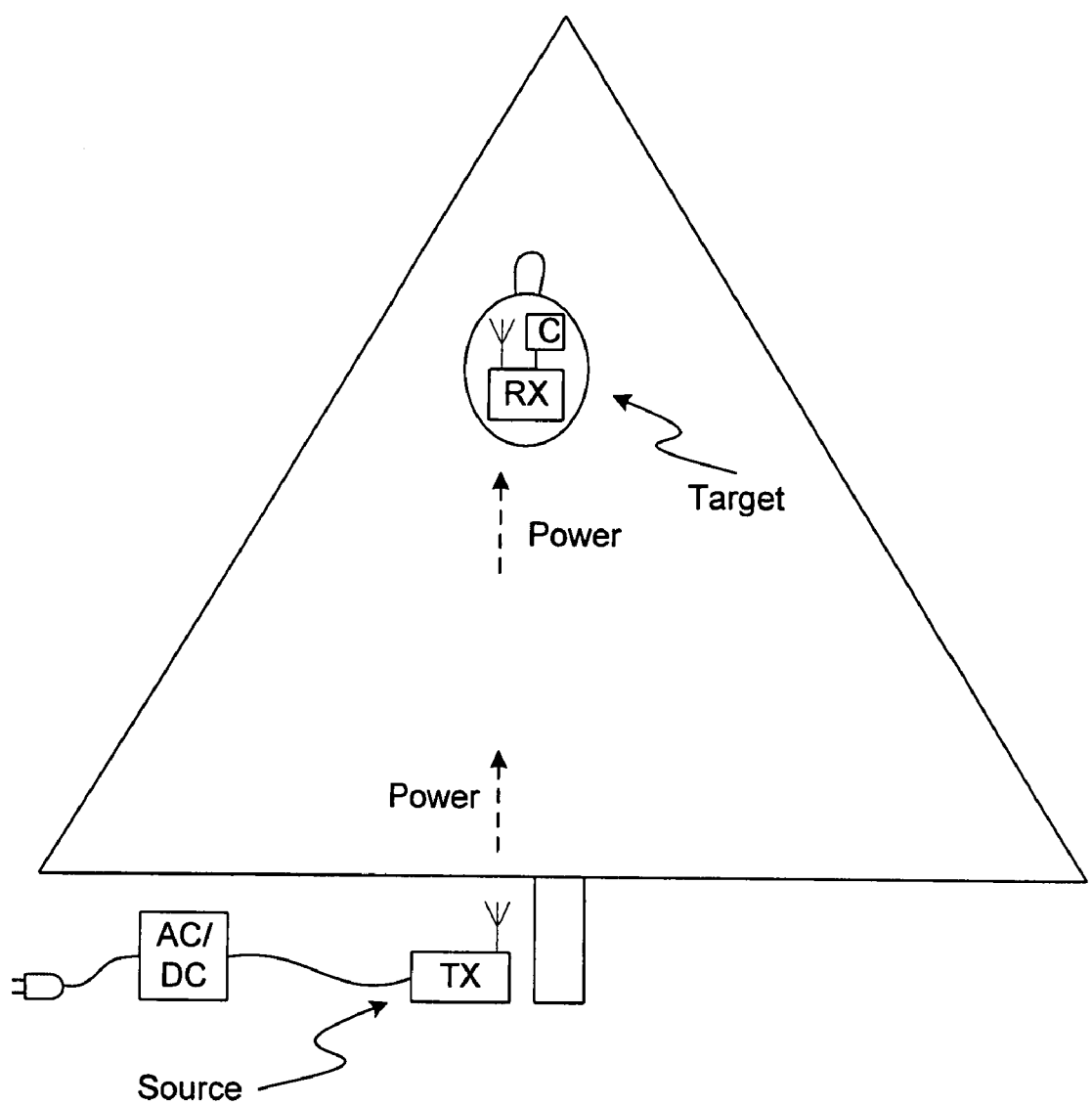
FIG. 23 is an illustration of a first embodiment of an assembly including a system for wirelessly powering an item and a structure for supporting the system according to the present invention.
Figure 24:
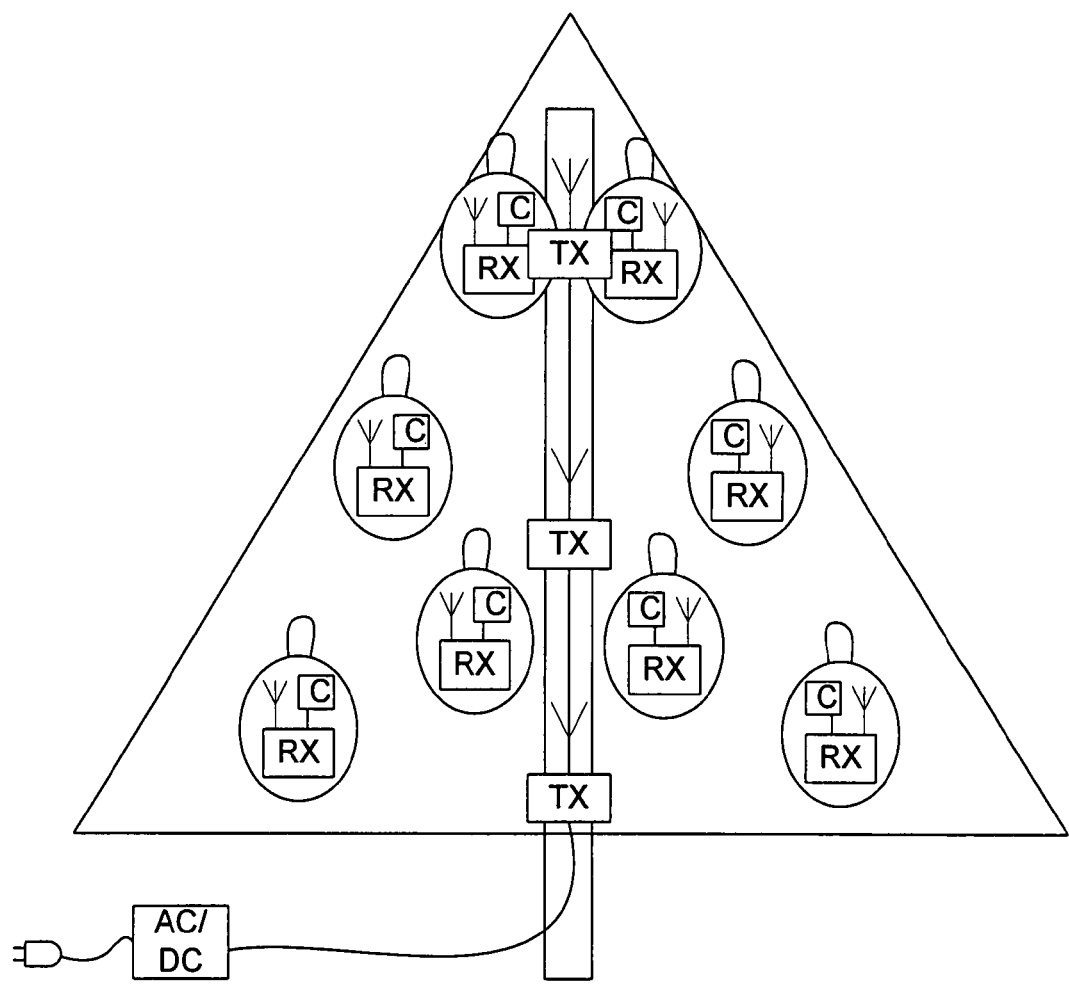
FIG. 24 is an illustration of a second embodiment of an assembly including a system for wirelessly powering an item and a structure for supporting the system according to the present invention.
Figure 25:
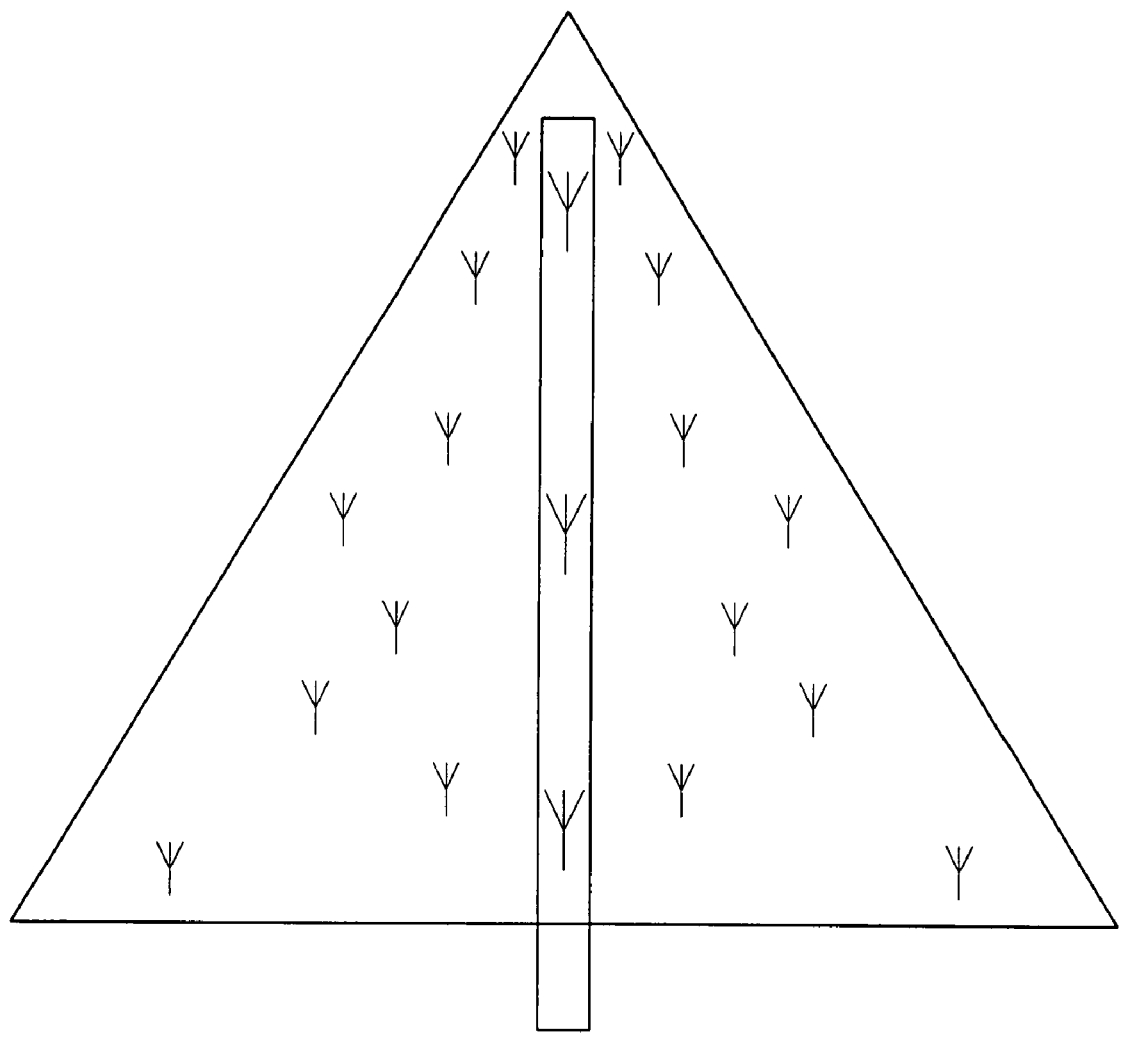
FIG. 25 is an illustration of a third embodiment of an assembly including a system for wirelessly powering an item and a structure for supporting the system according to the present invention, showing transmitting antenna and receiving antenna placement.
Figure 26:
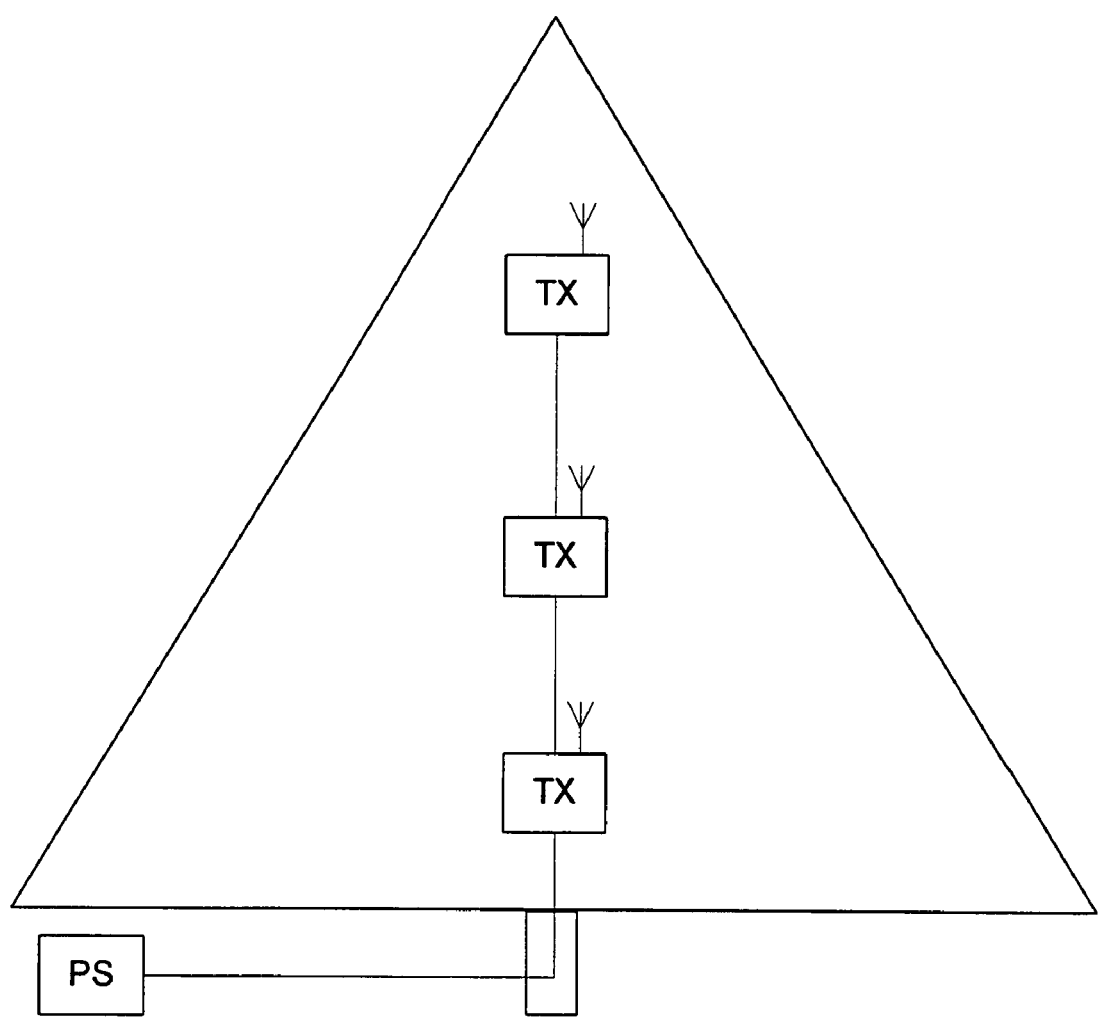
FIG. 26 is an illustration of a fourth embodiment of an assembly including a portion of a system for wirelessly powering an item and a structure for supporting the system according to the present invention, showing source placement.
Figure 27:
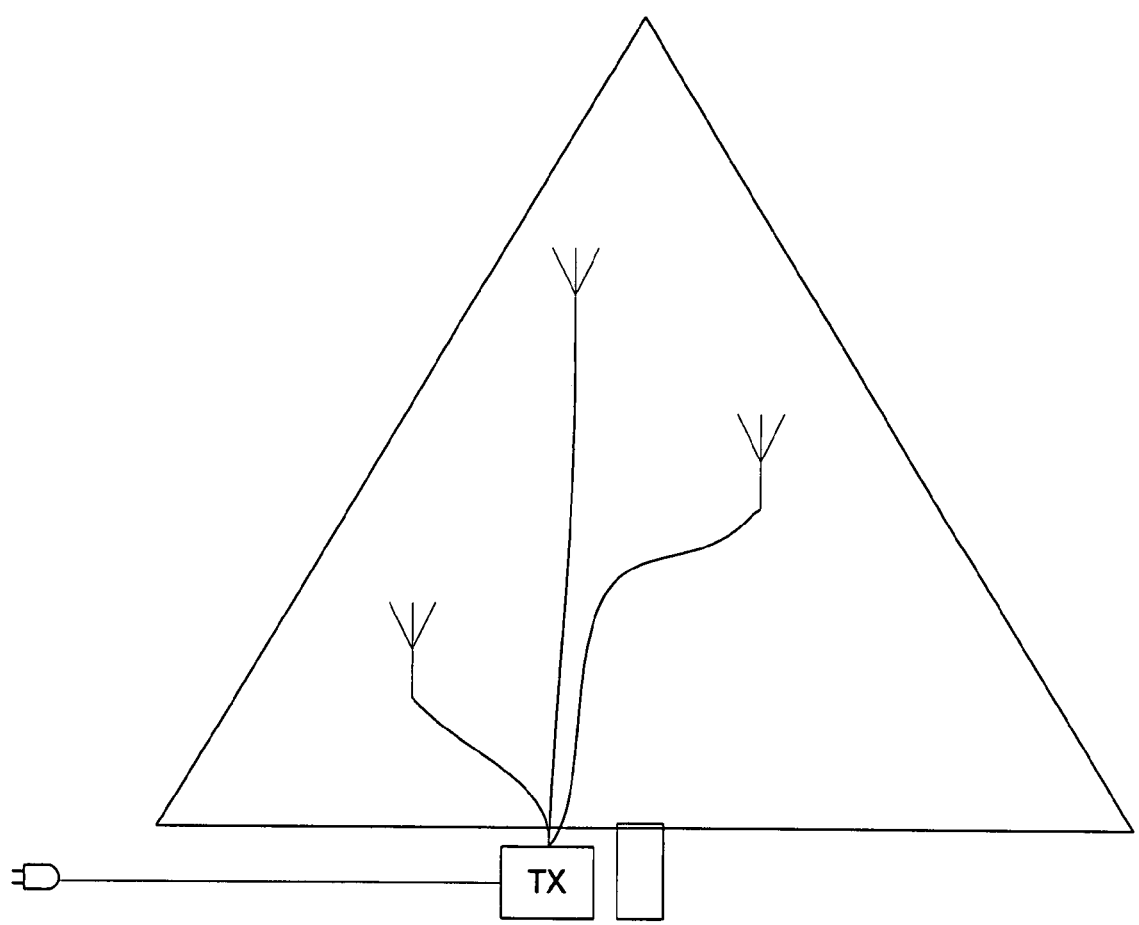
FIG. 27 is an illustration of a fifth embodiment of an assembly including a portion of a system for wirelessly powering an item and a structure for supporting the system according to the present invention, showing source placement.
Figure 28:
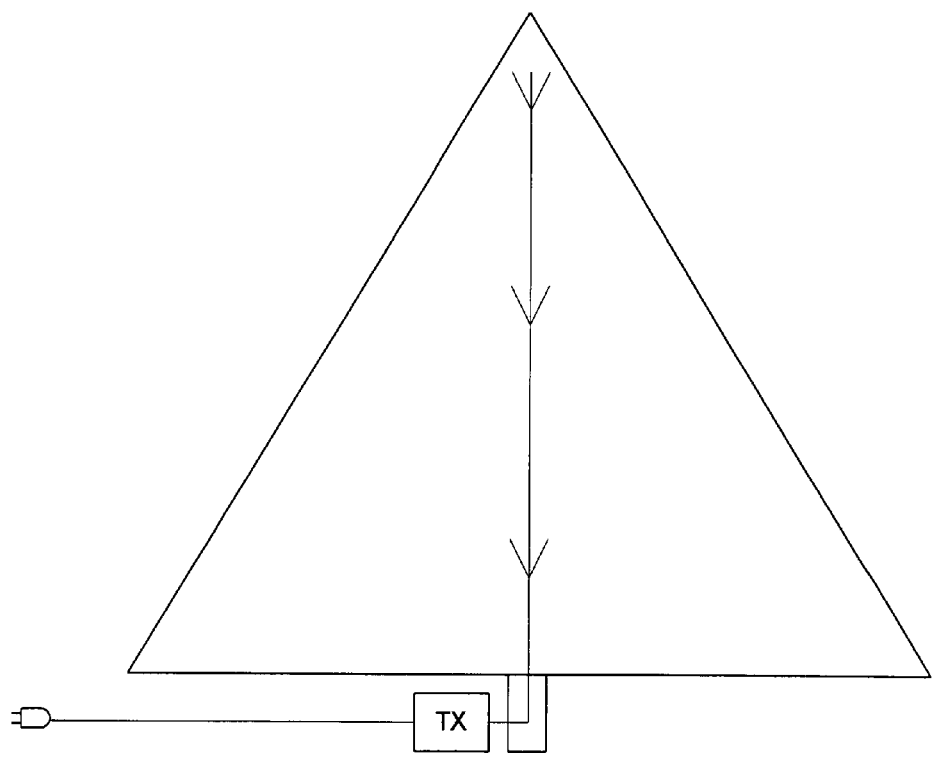
FIG. 28 is an illustration of a fifth embodiment of an assembly including a portion of a system for wirelessly powering an item and a structure for supporting the system according to the present invention, showing source placement.
Figure 29:
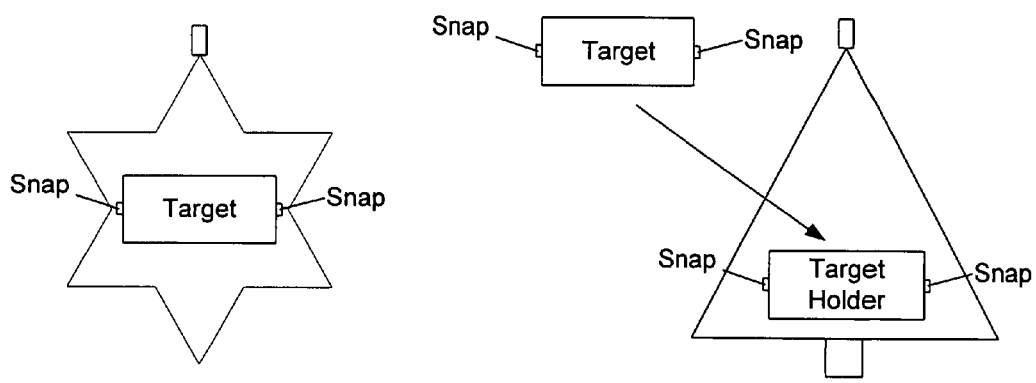
FIG. 29 is an illustration of a target that is removable allowing use with different faces.

Referring to FIGS. 23-24, an assembly, according to the present invention, includes a system 10 for wirelessly powering an item 12 and a structure 50 for supporting the system 10.

The system 10 is any system 10 according to the present invention. The system 10 includes at least one source 14, at least one target 16, and at least one component 18. The structure 50 is any structure 50 capable of physically supporting the system 10.

In the example illustrated in FIG. 23, the structure 50 is a Christmas tree 70. The system 10 includes a single source 14, a single target 16, and a single component 18. The target 16 and the component 18 are incorporated into the item 12 to be powered. For example, the item 12 may be an illuminating ornament 36, where the component 18 is an LED 54, or a musical ornament 36, where the component 18 is a music maker, such as a single recording of an MP3 player. The item 12 includes a loop for hanging the ornament 36 on the Christmas tree 70.

In the example illustrated in FIG. 24, the structure 50 is a Christmas tree 70. The system 10 includes a plurality of sources 14, a plurality of targets 16, and a plurality of components 18. One target 16 and one component 18 are incorporated into one item 12 to be powered. For example, the items 12 may be illuminating ornaments 36, where the components 18 are LEDs 54, or musical ornaments 36, where the components 18 are music makers. The items 12 include a loop for hanging the ornaments 36 on the Christmas tree 70.

As an example, a system 10 was designed for use as an assembly where the assembly was a Christmas tree 70. The Christmas tree 70 was artificial and was fitted with three transmitters 20 as shown in FIG. 24. The output power of each transmitter 20 was set to match the distance and power requirements of the lights 34 and ornaments 36. The transmitter 20 at the top of the tree 70 had the least distance between the transmitter 20 and ornaments 36 and lights 34. Therefore, the top transmitter 20 had the least amount of output power. Likewise, the bottom transmitter 20 had the greatest distance between the transmitter 20 and ornaments 36 and lights 34. Therefore, the bottom transmitter 20 had the greatest amount of output power. All three transmitters 20 used dipole antennas. The three transmitters 20 were supplied power in a series fashion. The DC output from the AC to DC converter supplied power to the bottom RF power transmitter 20 which supplied power to the middle RF power transmitter 20 which supplied power to the top RF power transmitter 20. The transmitters 20 were designed to hang from the branches of the tree 70 using hooks or loops like the ones commonly used to hang ornaments 36, which is the preferable method for a real tree 70 or installing the system 10 on an existing artificial tree 70. For a complete system 10, the transmitter(s) 20 and/or the antenna(s), would preferably be embedded in the main trunk of the tree 70, either by placement in slots or hollows in the trunk to receive them or during the manufacture of the tree 70 itself. The receivers 26 were implemented with a variety of antennas with dipoles being the dominant choice. Lighted and sound producing ornaments 36 were developed or retrofitted. Strings of lights 34 (LEDs 54) were fabricated using the topologies shown in FIGS. 15 and 17. Using FIG. 15, multiple dipole antennas with respective receivers 26 were secured to a non-conducting material (nylon string) using heat shrink. Each light 34 was a different color although it is possible to have all the same color. Using FIG. 17, multiple LEDs 54 were driven from a single receiver 26 in a strand of lights 34. Also, individual lights 34 were designed that were not connected to any other light, making them completely untethered.

Existing ornaments 36 were retrofitted with a target 16 in order to make them untethered. As an example, several ornaments 36 that were designed to connect to an existing string of lights 34 with the ornament 36 securing over a light 34 for illumination were retrofitted with a target 16. The resulting ornaments 36 received RF energy from the transmitters 20 mounted near the trunk of the tree 70 which was converted to light 34 in order to illuminate the ornament 36.

It should be noted that this embodiment may be used with a real or artificial tree 70.

FIGS. 25-29 illustrate various possible variations of embodiments of the present invention (these examples are not meant to be limiting).

A remote control may be included to control operation of the system 10, for example, to turn the system 10 on and off, to vary the intensity or brightness of lights 34/LEDs 54. A timer 60 or sensor (e.g., light detector) may be included to control operation of the system 10.

For any item 12 or source 14, a face 82 (or body) of the item 12 or source 14 may be interchangeable with a second face 82 for the item 12 or source 14. For example, if the item 12 is a snowflake, the face 82 defining the snowflake may be removed and replaced with a jack-o-lantern, such that the item 12 may be used for multiple occasions. As a specific example, the item 12 may be designed to accept the target 16 (the antenna and RF energy harvester 28) that is formed as a rectangular unit 84 that snaps into the face 82 that defines the shape of the item 12. The resulting target 16 can then be removed from one item 12 by releasing the securing snaps 86 and snapping the target 16 into the target 16 holder of the other item 12. An example of this can be seen in FIG. 29 where the faces 82 or items 12 are a star and a tree 70.

Similarly, a target 16 may be interchangeable between various components 18 and/or items 12. This allows the target 16 to be used with a multitude of different components 18/items 12.

The system 10 may include a communication component 18 in order to send data between parts of the system 10.

It should be noted that any polarization may be used in any of the embodiments to make the system 10, apparatus, or assembly more robust in operation (work in any orientation or polarization).

A method and apparatus for high efficiency rectification for various loads, which is suitable for receiving the RF power according to the present invention, has been discussed in detail in U.S. patent application Ser. No. 11/584,983, which is incorporated herein by reference.

The invention should not be confused with power transfer by inductive coupling, which requires the device to be relatively close to the power transmission source 14. The *RFID Handbook* by the author Klaus Finkenzeller defines the inductive coupling region as distance between the transmitter 20 and receiver 26 of less than 0.16 times lambda where lambda is the wavelength of the RF wave. The invention can be implemented in the near-field (sometimes referred to as inductive) region as well as the far-field region. The far-field region is distances greater than 0.16 times lambda.

In any embodiment of the present invention, the RF power transmitted may be limited to include power only, that is, data is not present in the signal. If data is required by the application, the data is, preferably, transmitted in a separate band and/or has a separate receiver 26, for example, via the communication component 18 discussed above.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus, comprising:
   a support structure;
   a source coupled to the support structure and configured to send wireless power;
   an item coupled to the support structure and including a target, a component, and a charge storage element,
      the target configured to receive the wireless power and convert the wireless power to a usable power, the target electrically connected to the component,
      the component configured to receive the usable power from the target and activate in response to the usable power,
      the charge storage element configured to store at least a portion of the usable power to supply to the component; and
   means for activating the component in response to detection of a predetermined voltage level of a voltage at the charge storage element.

2. An apparatus as described in claim 1 wherein the source includes a wireless power transmitter.

3. An apparatus as described in claim 1 wherein the source includes a wired power source.

4. An apparatus as described in claim 1 wherein the target includes an RF power receiver.

5. An apparatus as described in claim 4 wherein the RF power receiver includes a power harvester.

6. An apparatus as described in claim 5 wherein the power harvester includes circuitry to convert the wireless power into the usable power, the usable power being DC power.

7. An apparatus as described in claim 1 wherein the source is a first source, the apparatus further comprising a second source coupled to the support structure.

8. An apparatus as described in claim 7 wherein the first source and the second source are electrically connected to one another.

9. An apparatus as described in claim 8 wherein the first source and the second source are electrically connected in series.

10. An apparatus as described in claim 8 wherein the first source and the second source are electrically connected in parallel.

11. An apparatus as described in claim 1 wherein the item is a first item, the apparatus further comprising a second item coupled to the support structure and including a target and a component,
   the target of the second item configured to receive the wireless power and convert the wireless power to a usable power, the target of the second item electrically connected to the component of the second item,
   the component of the second item configured to receive the usable power from the target of the second item and activate in response to the usable power.

12. An apparatus as described in claim 11 wherein the first item and the second item are electrically connected.

13. An apparatus as described in claim 1 wherein the component is a first component, the first item includes a second component.

14. An apparatus as described in claim 13 wherein the first component and the second component are electrically connected to one another.

15. An apparatus as described in claim 1 wherein the source includes an attachment mechanism that couples the source to the support structure.

16. An apparatus as described in claim 1 wherein the item includes an attachment mechanism that couples the item to the support structure.

17. An apparatus as described in claim 1 wherein the source is configured to receive operational power from batteries.

18. An apparatus as described in claim 2 wherein the wireless power transmitter is configured to transmit pulses of power.

19. An apparatus as described in claim 1, wherein the activating means includes a switch that facilitates or inhibits supply of the usable power to the component.

20. An apparatus as described in claim 19 wherein the activating means includes a voltage sensor that activates the switch when the voltage at the charge storage element reaches the predetermined voltage level.

21. An apparatus as described in claim 19 wherein the activating means includes a timer that controls activation of the switch.

22. An apparatus as described in claim 1 wherein the item includes a housing having a face, the target being removably coupled to the face.

23. An apparatus as described in claim 1 wherein the component when activated can be sensed by a person.

24. An apparatus as described in claim 1 wherein:
   the target is a first target; and
   the item includes a second target,
   the second target configured to receive the wireless power and convert the wireless power to a usable power, the second target electrically connected to the first target.

25. An apparatus as described in claim 1 wherein:
   the target is a first target; and
   the item includes a second target,
   the second target configured to receive the wireless power and convert the wireless power to a usable power, the second target electrically connected to the component,
   the component configured to receive the usable power from the first target and the usable power from the second target.

26. An apparatus as described in claim 1 wherein the item includes an antenna operatively coupled to the target.

27. An apparatus as described in claim 1 wherein the item includes a plurality of antennas, the target being operatively coupled to each antenna from the plurality of antennas the target.

28. An apparatus as described in claim 1 wherein the target includes an antenna.

29. An apparatus as described in claim 1 wherein the target includes a plurality of antennas.

30. An apparatus as described in claim 1 wherein the support structure is portable and includes a base and an element extending from the base.

31. An apparatus as described in claim 1, wherein the component is a first component and the target is a first target, the item includes a second target electrically connected to a second component and configured to receive the wireless power, to convert the wireless power to a useable power, and to activate the second component using the useable power, the second target electrically connected to the first target.

32. An apparatus as described in claim 24, wherein the second target is configured to activate the second component using the useable power.

33. An apparatus as described in claim 1, wherein the activating means includes a switch electrically connected to the target and the component, the switch configured to provide the usable power to the component when the switch is activated and not provide the usable power of the target to the component when the switch is not activated.

34. An apparatus comprising:
  a housing;
  a target holder coupled to the housing and configured to securely and removably accept a target, the target including a wireless RF energy harvester configured to receive wireless energy and convert it into DC; and
  at least one component disposed in the housing and configured to be electrically connected to and powered by the target when the target is securely and removably accepted at the target holder.

35. An apparatus as described in claim 34 wherein the housing has a snowflake shape or an orb shape or a jack-o-lantern shape or a candy cane shape.

36. An apparatus as described in claim 34, further comprising a plurality of faces that are interchangeable on the housing.

37. An apparatus as described in claim 34 wherein the target holder securely and removably accepts the target via a snap fit with the target.

38. An apparatus as described in claim 36 wherein at least one face from the plurality of faces has a snowflake shape, an orb shape, a jack-o-lantern shape or a candy cane shape.

39. An apparatus as described in claim 34 further comprising an antenna operatively coupled to the target when the target is securely and removably accepted at the target holder.

40. An apparatus as described in claim 34 further comprising a plurality of antennas, each antenna from the plurality of antennas operatively coupled to the target when the target is securely and removably accepted at the target holder.

41. An apparatus, comprising:
  an RF power receiver configured to receive wireless power and convert the wireless power to a useable power;
  a charge storage element configured to store at least a portion of the usable power, the charge storage element operatively coupled to the RF power receiver;
  a component configured to be electrically connected to and to receive the useable power from the charge storage element, the component activates in response to the usable power;
  a switch configured to provide the usable power to the component when the switch is activated and not provide the usable power to the component when the switch is not activated; and
  a voltage sensor operatively coupled to the charge storage element and the switch, the voltage sensor configured to activate the switch when a voltage at the charge storage element reaches a predetermined voltage level.

42. An apparatus as described in claim 41 wherein the component when activated can be sensed by a person.

43. An apparatus as described in claim 41 further comprising an indicator that provides an indication that a voltage at the charge storage element is not less than a predetermined voltage level when active.

44. An apparatus, comprising:
  an RF power receiver configured to receive wireless power and convert the wireless power into usable power;
  a charge storage element configured to store at least a portion of the usable power, the charge storage element operatively coupled to the RF power receiver;
  a component operatively coupled to the charge storage element and configured to receive the usable power from the charge storage element, the component powered at least in part by the usable power;
  an indicator that provides an indication that a voltage at the charge storage element is not less than a predetermined voltage level when active;
  a voltage sensor operatively coupled to the charge storage element and the indicator, the voltage sensor configured to activate the indicator when the voltage at the charge storage element reaches the predetermined voltage level; and
  a switch configured to provide the usable power to the component when the switch is activated and not provide the usable power to the component when the switch is not activated, the voltage sensor configured to activate the switch when the voltage at the charge storage element reaches the predetermined voltage level.

45. An apparatus as described in claim 44 wherein the component when activated can be sensed by a person.

46. An apparatus as described in claim 44 further comprising a plurality of antennas, each antenna from the plurality of antennas operatively coupled to the RF power receiver.

47. An apparatus, comprising:
  a housing configured to be accepted at a target holder of an item such that the housing is securely and removably coupled to the item when the housing is accepted at the target holder; and
  an RF energy harvester coupled to the housing and configured to provide usable power to a component when the housing is securely and removably coupled to the item.

48. An apparatus as described in claim 47 wherein the housing includes at least one securing device configured to engage the target holder such that the housing is securely and removably coupled to the item when the at least one securing device engages the target holder.

49. An apparatus as described in claim 47 wherein the target holder includes at least one securing device configured to engage the housing such that the housing is securely and removably coupled to the item when the at least one securing device engages the housing.

50. An apparatus as described in claim 47 further comprising a plurality of antennas, each antenna from the plurality of antennas operatively coupled to the RF energy harvester.

51. An apparatus as described in claim 47 wherein the RF energy harvester is a first RF energy harvester, the apparatus further comprising:
  a second RF energy harvester coupled to the housing and configured to provide usable power to the component.

* * * * *